United States Patent
Kakinada et al.

(10) Patent No.: US 11,729,864 B2
(45) Date of Patent: *Aug. 15, 2023

(54) ENHANCED DOWNLINK MESSAGE DELIVERY IN WIDE AREA NETWORKS

(71) Applicant: Charter Communications Operating, LLC, St. Louis, MO (US)

(72) Inventors: Umamaheswar Achari Kakinada, Greenwood Village, CO (US); Hossam Hmimy, Aurora, CO (US); Wael Guibene, Parker, CO (US); Muhammad Khan, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,977

(22) Filed: Apr. 25, 2022

(65) Prior Publication Data

US 2022/0256650 A1 Aug. 11, 2022

Related U.S. Application Data

(63) Continuation of application No. 16/798,422, filed on Feb. 23, 2020, now Pat. No. 11,317,471.

(51) Int. Cl.
*H04W 88/16* (2009.01)
*H04B 17/318* (2015.01)
*H04W 72/23* (2023.01)
*H04W 72/52* (2023.01)
*H04W 72/53* (2023.01)

(52) U.S. Cl.
CPC .......... *H04W 88/16* (2013.01); *H04B 17/318* (2015.01); *H04W 72/23* (2023.01); *H04W 72/52* (2023.01); *H04W 72/53* (2023.01)

(58) Field of Classification Search
CPC . H04W 72/042; H04W 72/049; H04W 88/16; H04B 17/318
See application file for complete search history.

(56) References Cited

U.S. PATENT DOCUMENTS

| | | | | |
|---|---|---|---|---|
| 2007/0242601 A1* | 10/2007 | Gbadegesin | ........ | H04L 12/5692 370/216 |
| 2018/0139274 A1* | 5/2018 | Gandhi | ................... | H04W 4/00 |
| 2018/0167982 A1* | 6/2018 | Lee | ......................... | H04W 76/10 |
| 2020/0107402 A1* | 4/2020 | Di Girolamo | ........ | H04W 88/16 |

* cited by examiner

*Primary Examiner* — Jamal Javaid
*Assistant Examiner* — Ryan C Kavleski
(74) *Attorney, Agent, or Firm* — Straub & Straub; Michael P. Straub; Stephen T. Straub

(57) ABSTRACT

A network server selects a gateway, from among a plurality of alternative candidate gateways, to use for downlink wireless communication to an end node (EN) based on additional factors in addition to RSSI. Exemplary additional factors include: SNR, gateway loading, message loading, backhaul network loading, device type, application type, application priority, operator preferences, device/application black-lists, white-lists, and red-lists, number of devices, number of transmitting devices in a given time interval, operator rules and priorities. In some embodiments, the network server calculates a composite weighted metric (CWM) for each of the alternative candidate gateways which may be used for downlink, subject to operator policy rules, and selects to use a gateway based on the results, e.g. selects the gateway with the highest CWM.

18 Claims, 17 Drawing Sheets

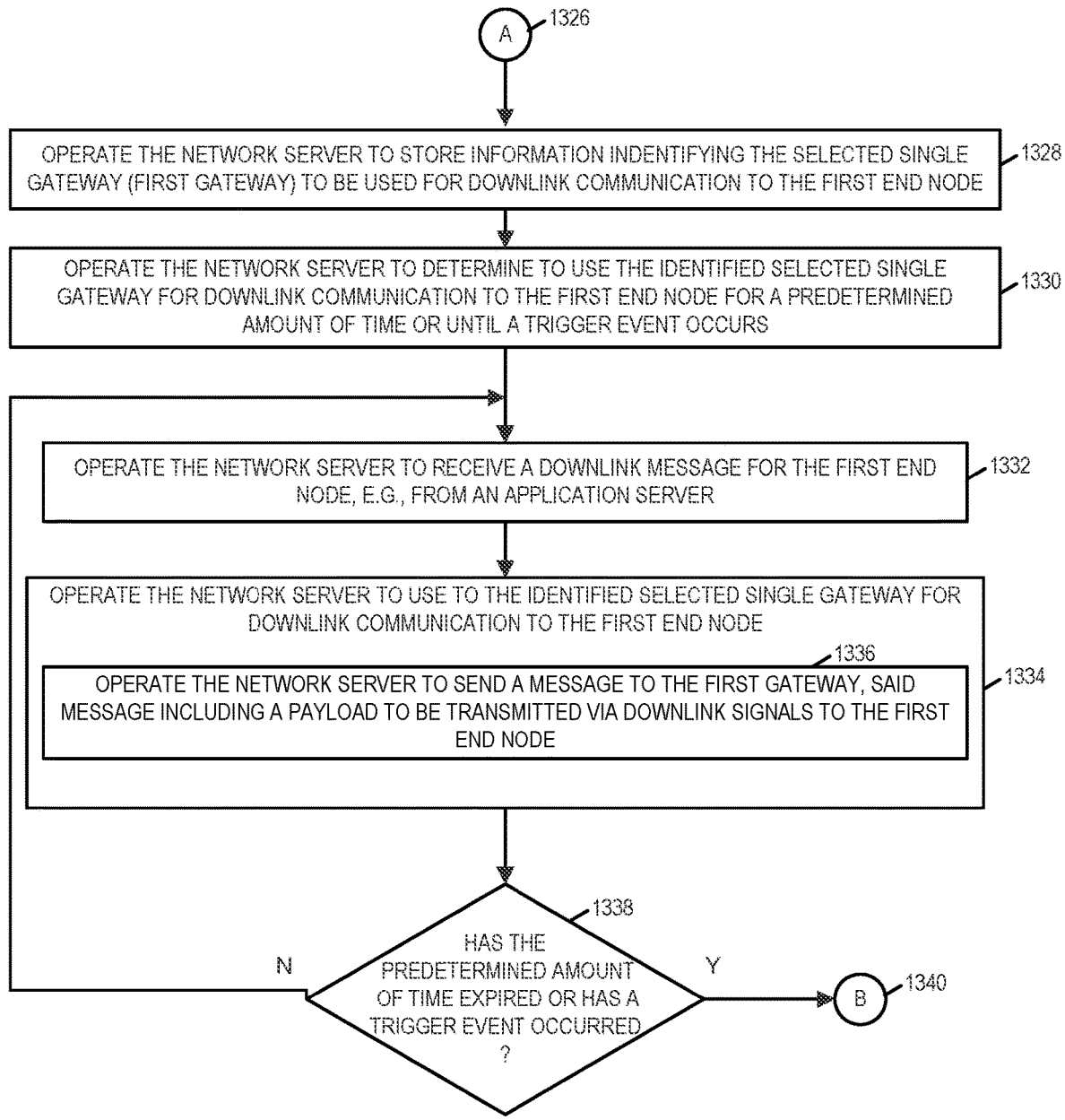

US 11,729,864 B2

ENHANCED DOWNLINK MESSAGE DELIVERY IN WIDE AREA NETWORKS

RELATED APPLICATIONS

The present application is a continuation of U.S. patent application Ser. No. 16/798,422 filed Feb. 23, 2020 which published as U.S. patent publication US 2021-0267014 A1 on Aug. 26, 2021, and is hereby expressly incorporated by reference in their entirety.

FIELD

The present invention relates to wireless communications systems, and more particularly, to methods and apparatus for supporting enhanced downlink message delivery in communications systems, e.g., wide area network communications systems.

BACKGROUND

In some wide area networks an end node (EN) device transmits uplink message wireless signals, which are broadcast signals, intended to be recovered by any of one or more gateways within range of the end node device, and forwarded toward a network server. Typically, each gateway which successfully receives the uplink message also measures the received signal strength of the uplink signal, obtaining a received signal strength indicator (RSSI) corresponding to the EN and the gateway. Thus in the case where the same uplink signal message from the EN device has been successfully received by multiple gateways, the network service will receive multiple RSSIs (one for each GW which successfully received the signal). The network server sends the payload toward the intended destination, e.g. an application server. Typically, the selection of which GW to use for sending downlink messages to the end node device is based on the RSSIs, e.g., the GW corresponding to the highest RSSI is selected to be used for communicating downlink messages to the end node device.

For example, currently per Long Range (LoRa) specification, when an application server needs to send downlink messages to a device, a LoRA Radio Gateway (GW) is selected by the network server based on Received Signal Strength Indicator (RSSI) values corresponding to uplink messages from the device. This approach does not take into account other aspects such as: messaging load on the gateway being selected, number of devices associated with the gateway, and preferences of the operator and customer. This approach being used may lead to: loss of messages due to gateway over loading, sub-optimal usage of expensive operator access network resources, a lack of flexibility in network operation, and/or operators not be able to offer differentiated services.

Based on the above discussion, there is a need for new methods and apparatus for facilitating intelligent selection of a gateway to use for downlink sending downlink messages to an end node device in a wide area network communications system.

SUMMARY

A network server selects a gateway, from among a plurality of alternative candidate gateways, to use for downlink wireless communication to an end node (EN) based on one or more additional factors in addition to RSSI. Exemplary additional factors include: SNR, gateway loading, message loading, backhaul network loading, device type, application type, application priority, operator preferences, device/application black-lists, white-lists, and red-lists, number of devices, number of transmitting devices in a given time interval, operator rules and priorities. In some embodiments, the network server calculates a composite weighted metric (CWM) for each of the alternative candidate gateways which may be used for downlink, subject to operator policy rules, and selects to use a gateway based on the results, e.g. selects the gateway with the highest CWM.

An exemplary communications method, in accordance with some embodiments, comprises: operating a network server to select, from a plurality of gateways, a first gateway to be used for downlink communication to a first end node, based on received signal strength indicator (RSSI) information and at least one or more pieces of information, said one or more pieces of information including at least one of: i) message load on one or more gateways in said plurality of gateways, ii) operator policy information, iii) type of application for which downlink communication is to be used; iv) list information indicating one or more gateways which are to be used for a particular application, customer or location or v) list information indicating one or more gateways which are not to be used for a particular application, customer or location; and operating the network server to send a message to the first gateway, said message including a payload to be transmitted via downlink signals to the first end node.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 10B is a second part of an exemplary method of operating a communications system in accordance with an exemplary embodiment.

FIG. 10 comprises the combination of FIG. 10A and FIG. 10B.

DETAILED DESCRIPTION

Figure 1:
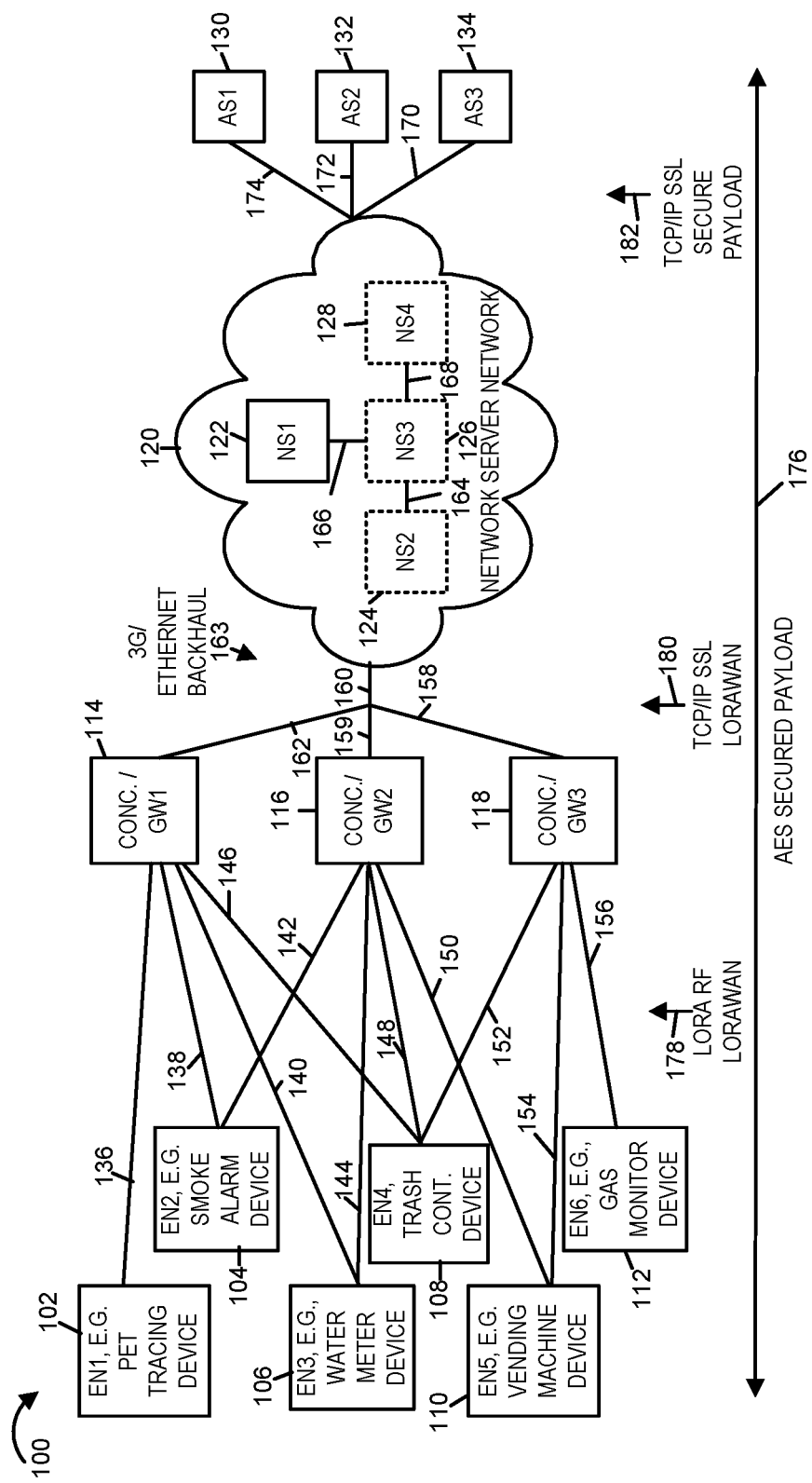
FIG. 1 is a drawing illustrating Long Range (LoRa) network architecture.

FIG. 1 is a drawing of a communications system 100 illustrating Long Range (LoRa) network architecture. Communications system 100 includes a plurality of end nodes (ENs) (EN 1, e.g., a pet tracking device, EN2 104, e.g., a smoke alarm device, EN3 106, e.g., a water meter device, EN4 108, e.g., a trash container device, EN5, e.g., a vending machine device, EN6 112, e.g., a gas monitoring device 112), a plurality of concentrator/Gateways (Conc./GW1 114, Conc./GW2 116, Conc./GW3 118) a network server network 120 including one or more network nodes (network server 1 (NS 1) 122, optional network server 2 (NS 2) 125, optional network server 3 (NS 3) 126, optional network server 4 (NS 4) 128), and a plurality of application servers (AS 1 130, AS2 132, AS3 134) coupled together. In this example, EN1 102 is coupled to concentrator/gateway 1 114 via communications link 136; EN2 104 is coupled to concentrator/gateway 1 114 via communications link 138 and to concentrator/gateway 2 116 via communications link 142; EN3 106 is coupled to concentrator/gateway 1 114 via communications link 140 and to concentrator/gateway 2 116 via communications link 143; EN4 108 is coupled to: concentrator/gateway 1 114 via communications link 146, concentrator/gateway 2 116 via communications link 148 and to concentrator/gateway 3 118 via communications link 152; EN5 110 is coupled to concentrator/gateway 2 116 via communications link 150 and to concentrator/gateway 3 118 via communications link 155; and EN 6 112 is coupled to concentrator/gateway 3 118 via communications link 156.

The communications links (136, 138, 140, 142, 144, 146, 148, 150, 152, 154, 156) are LoRa RF wireless communications links conveying LoRa wireless signals as part of a Long Range Wide Area Network (LoRaWAN).

Concentration/gateway 1 114 is coupled to network server network 120 via communications links 162, 160. Concentration/gateway 2 116 is coupled to network server network 120 via communications links 159, 160. Concentration/gateway 3 118 is coupled to network server network 120 via communications links 159, 160. Communications links 158, 159, 160, 162 are part of a 3G/Ethernet backhaul 163. Communications links 158, 159, 160, 162 are used to communicate Transmission Control Protocol/Internet Protocol Secure Sockets Layer (TCP/IP SSL) LoRaWAN signals.

Network server network 120 includes NS 1 122. In some embodiments, network server network 120 further includes one or more of all of NS 2 124, NS 3 126 and NS 4 128. NS 1 122 is coupled to NS 3 126 via communications link 166. NS 2 124 is coupled to NS 3 128 via communication link 154. NS 3 126 is coupled to NS 4 128 via communications link 168.

Application server 1 (AS 1) 130 is coupled to network server network 120 via communication link 174. Application server 2 (AS 2) 132 is coupled to network server network 120 via communication link 172. Application server 3 (AS 3) 134 is coupled to network server network 120 via communication link 170. Communications links (170, 172, 174) are used to communicate TCP/IP SSL secure payload signals 182.

An Advanced Encryption Standard (AES) secured payload 176 is communicated between each of the end node devices (102, 104, 106, 108, 110, 112) and one of the application servers (130, 132, 134).

Figure 2:
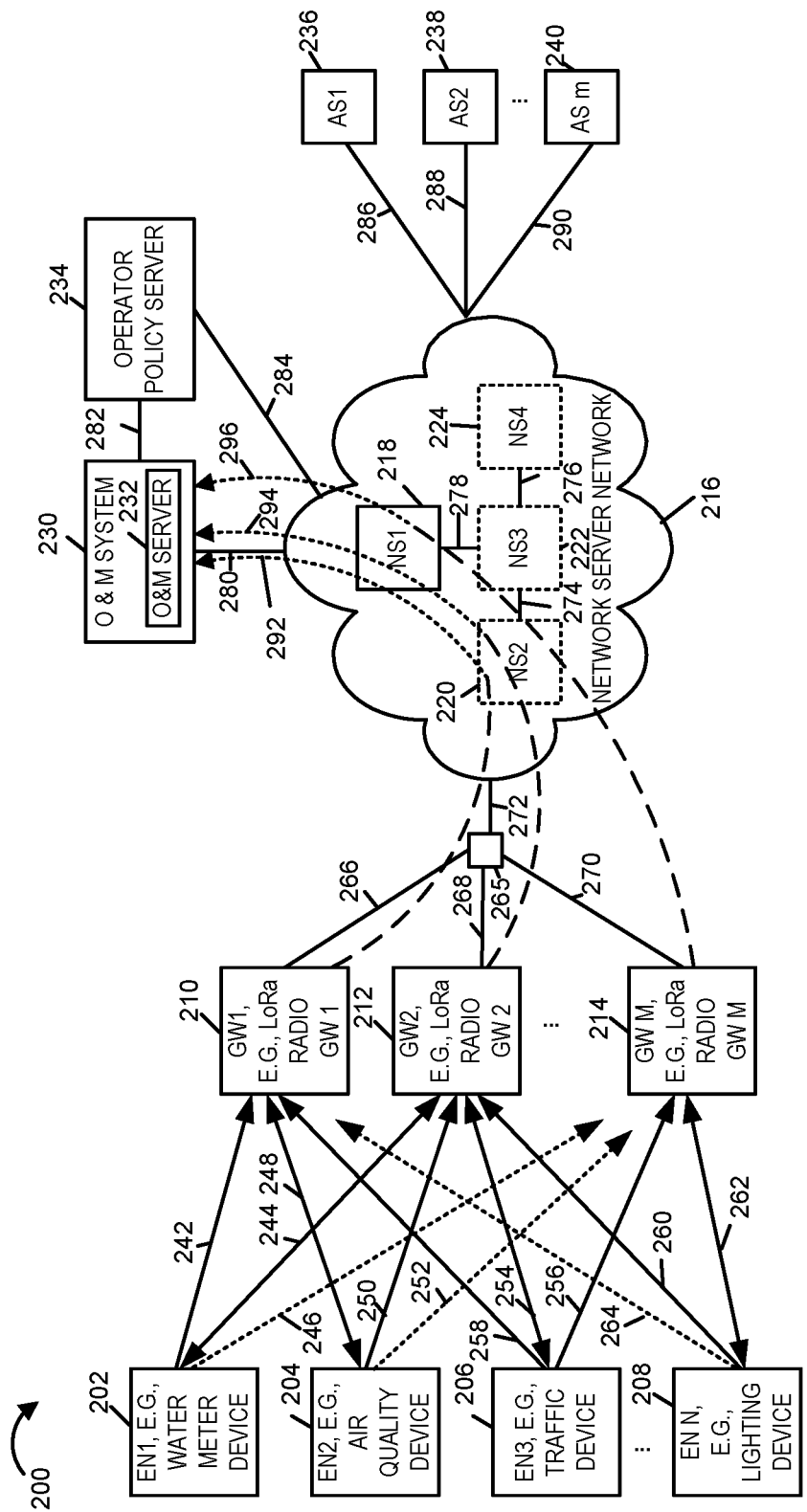
FIG. 2 is a drawing of a communications system, e.g., a wide area network wireless communications system, implemented in accordance with an exemplary embodiment.

FIG. 2 is a drawing of a communications system 200, e.g., a wide area network communications system, implemented in accordance with an exemplary embodiment. Exemplary communications system 200 includes a plurality of end nodes (ENs) (EN 1 202, e.g., a water meter device, EN 2 204, e.g., an air quality device, EN 3 206, e.g., a traffic device, . . . , EN N 208, e.g., a lighting device), a plurality of Gateways (GW 1 210, e.g., LoRa radio GW 1, GW 2 212, e.g., LoRa radio GW 2, . . . , GW M 214, e.g., LoRa radio GW M,) a network server network 216 including one or more network nodes (network server 1 218, optional network server 2 220, optional network server 3 222, optional network server 4 224), and a plurality of application servers (AS 1 235, AS 2 236, . . . , AS m 240), and organization and management (O&M) system 230 including an O&M server 232, and an operator policy server 234 coupled together.

Each of the end nodes (ENs) may be coupled to one or more or all of the GWs (210, 212, . . . , 214). For example, an EN transmits broadcast uplink signals, e.g., conveying payload intended for an AS. The uplink signals from the EN may be received by one or more or all of the GWs and received payload is forwarded to a network node. The network node sends the received forwarded payload to the intended application server. The NS selects, e.g., for each EN, a GW to use for downlink wireless transmission to the EN. The selection is based on additional factors in addition to RSSI.

In the example of FIG. 2, EN 1 202 has transmitted broadcast uplink signals which have been successfully recovered by GW 1 210 and GW 2 212, as indicated by solid lines 242, 244, with an arrowhead on GW 1 210, GW 2 212, respectively; however, GW M 214 has not successfully recovered the uplink signals from EN 1 202 as indicated by dotted line arrow 246 which does not reach GW M 214. In the example of FIG. 2, NS 218 has decided to use GW 2 212 for transmitting downlink wireless signals to EN 1 202, as indicated by an arrowhead on the end of solid line 244 touching EN 1 202. In accordance with a feature of various embodiments, the particular GW, which is GW 2 212, selected to be used by the NS 218 for communicating downlink messages to EN 1 202 is not necessarily the GW corresponding to the highest RSSI with regard to received uplink signals from EN 1 202 measured by the GWs, as other factors such as message loading, operator policies, application type, application priority, white list associations, black list associations, etc. are used in the selection.

In the example of FIG. 2, EN 2 202 has transmitted broadcast uplink signals which have been successfully recovered by GW 1 210 and GW 2 212, as indicated by solid lines 248, 250, with an arrowhead on GW 1 210, GW 2 212, respectively; however, GW M 214 has not successfully recovered the uplink signals from EN 2 204 as indicated by dotted line arrow 252 which does not reach GW M 214. In the example of FIG. 2, NS 218 has decided to use GW 1 210 for transmitting downlink wireless signals to EN 2 204, as indicated by an arrowhead on the end of solid line 248 touching EN 2 204. In accordance with a feature of various embodiments, the particular GW, which is GW 1 210, selected to be used by the NS 218 for communicating downlink messages to EN 2 204 is not necessarily the GW corresponding to the highest RSSI with regard to received uplink signals from EN 2 204 measured by the GWs, as other factors such as message loading, operator policies, application type, application priority, white list associations, black list associations, etc. are used in the selection.

In the example of FIG. 2, EN 3 206 has transmitted broadcast uplink signals which have been successfully recovered by GW 1 210, GW 2 212, and GW M 214, as indicated by solid lines 258, 254, 256, each with an arrowhead on GW 1 210, GW 2 212, GW M 214 respectively. In the example of FIG. 2, NS 218 has decided to use GW 2 212 for transmitting downlink wireless signals to EN 3 206, as indicated by an arrowhead on the end of solid line 254 touching EN 3 206. In accordance with a feature of various embodiments, the particular GW, which is GW 2 214, selected to be used by the NS 218 for communicating downlink messages to EN 3 206 is not necessarily the GW corresponding to the highest RSSI with regard to received uplink signals from EN 3 206 measured by the GWs, as other factors such as message loading, operator policies, application type, application priority, white list associations, black list associations, etc. are used in the selection.

In the example of FIG. 2, EN N 208 has transmitted broadcast uplink signals which have been successfully recovered by GW 2 212 and GW M 214, as indicated by solid lines 260, 262, with an arrowhead on GW 2 212, GW M 214, respectively; however, GW 1 210 has not successfully recovered the uplink signals from EN N 208 as indicated by dotted line arrow 264 which does not reach GW 1 210. In the example of FIG. 2, NS 218 has decided to use GW M 214 for transmitting downlink wireless signals to EN N 208, as indicated by an arrowhead on the end of solid line 262 touching EN N 208. In accordance with a feature of various embodiments, the particular GW, which is GW M 214, selected to be used by the NS 218 for communicating downlink messages to EN N 208 is not necessarily the GW corresponding to the highest RSSI with regard to received uplink signals from EN N 208 measured by the GWs, as other factors such as message loading, operator policies, application type, application priority, white list associations, black list associations, etc. are used in the selection.

GW 1 210 is coupled to node 265, e.g., a router, via backhaul communications link 266. GW 2 212 is coupled to node 265 via backhaul communications link 268. GW M 213 is coupled to node 265 via backhaul communications link 270. Node 265 is coupled pt network server network 216, via communications link 272.

Network server network 216 includes network server 1 (NS 1) 218. In some embodiments, network server network 216 further includes one or more of all of NS 2 220, NS 3 224 and NS 4 224. NS 1 218 is coupled to NS 3 222 via communications link 278. NS 2 220 is coupled to NS 3 222 via communication link 274. NS 3 222 is coupled to NS 4 224 via communications link 276.

Application server 1 (AS 1) 236 is coupled to network server network 216 via communication link 286. Application server 2 (AS 2) 238 is coupled to network server network 216 via communication link 288. Application server m (AS m) 240 is coupled to network server network 216 via communication link 290. In some embodiments, the ASs (236, 238, ... 240) are communications end points for communications with end node devices (202, 204, 206, ..., 208). For example, in some embodiments, each EN device is associated with a particular AS, e.g., an AS which supports the application corresponding to the EN device. In one example, each of the ENs (202, 204, 206, 208) are associated with AS 1 236, e.g., AS1 236 includes a water meter reporting data collection application, a air quality reporting data collection application, a traffic monitoring and/or traffic control application, and a lighting status and/or lighting control application.

O& M system 230 is coupled to network server network 216 via communications link 280. O & M system 230 is coupled to operator policy server 234 via communications link 282. Operator policy server 234 is coupled to network server network 216 via communications link 294. Operator policy server 234 communicates policies, rules, and/or information, e.g., black lists, white lists, red lists, etc., to the network server 218 which are used in making selection decisions as to which GW to use for downlink for each EN device.

Each of the GWs (210, 212, ..., 214) communicate gateway load information and other metrics to the O& M system, as indicated by dashed line arrows (292, 294, ..., 296), respectively. The gateway load information and other metrics or processed information based on the gateway load information and other metrics are communicated to a network server, e.g., NS 1 218, and used by the network server to decide which GW to use for downlink wireless transmission to an EN. The selected GW for an EN, in accordance with the present invention, may be, and sometimes is, a different gateway than the gateway with the highest RSSI for the EN.

Figure 3:
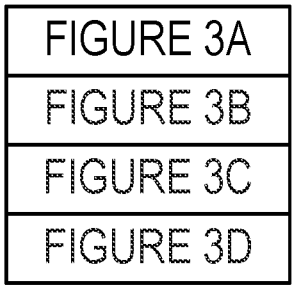
FIG. 3, comprises the combination of FIG. 3A, FIG. 3B, FIG. 3C and FIG. 3D, is a signaling diagram 300.
Figure 3A:
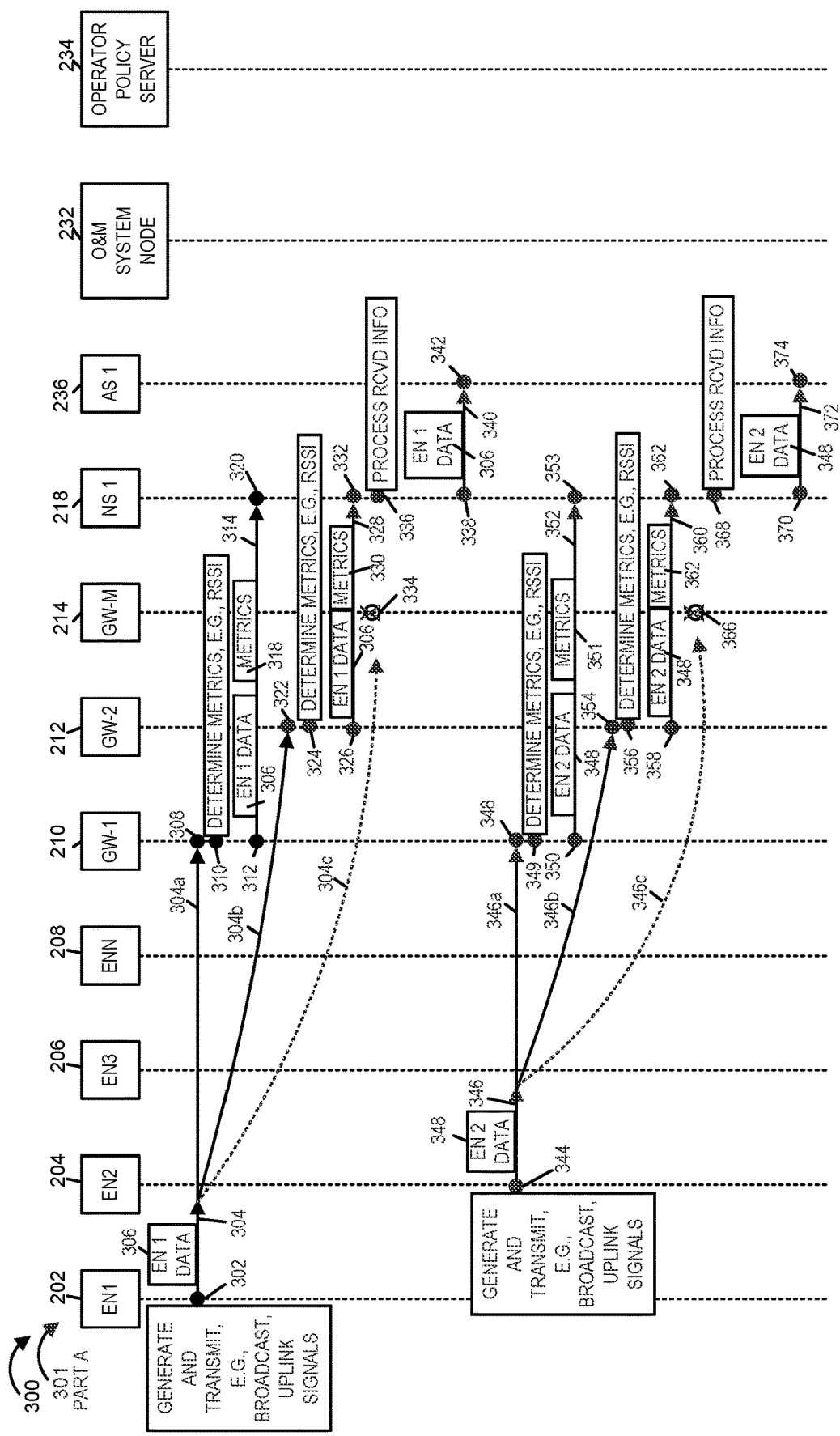
FIG. 3A is first part of an exemplary signaling diagram illustrating an exemplary communications method, said exemplary communication method including the selection of a gateway to be used for downlink communications with an end node based on additional factors in addition to RSSI, in accordance with an exemplary embodiment.
Figure 3B:
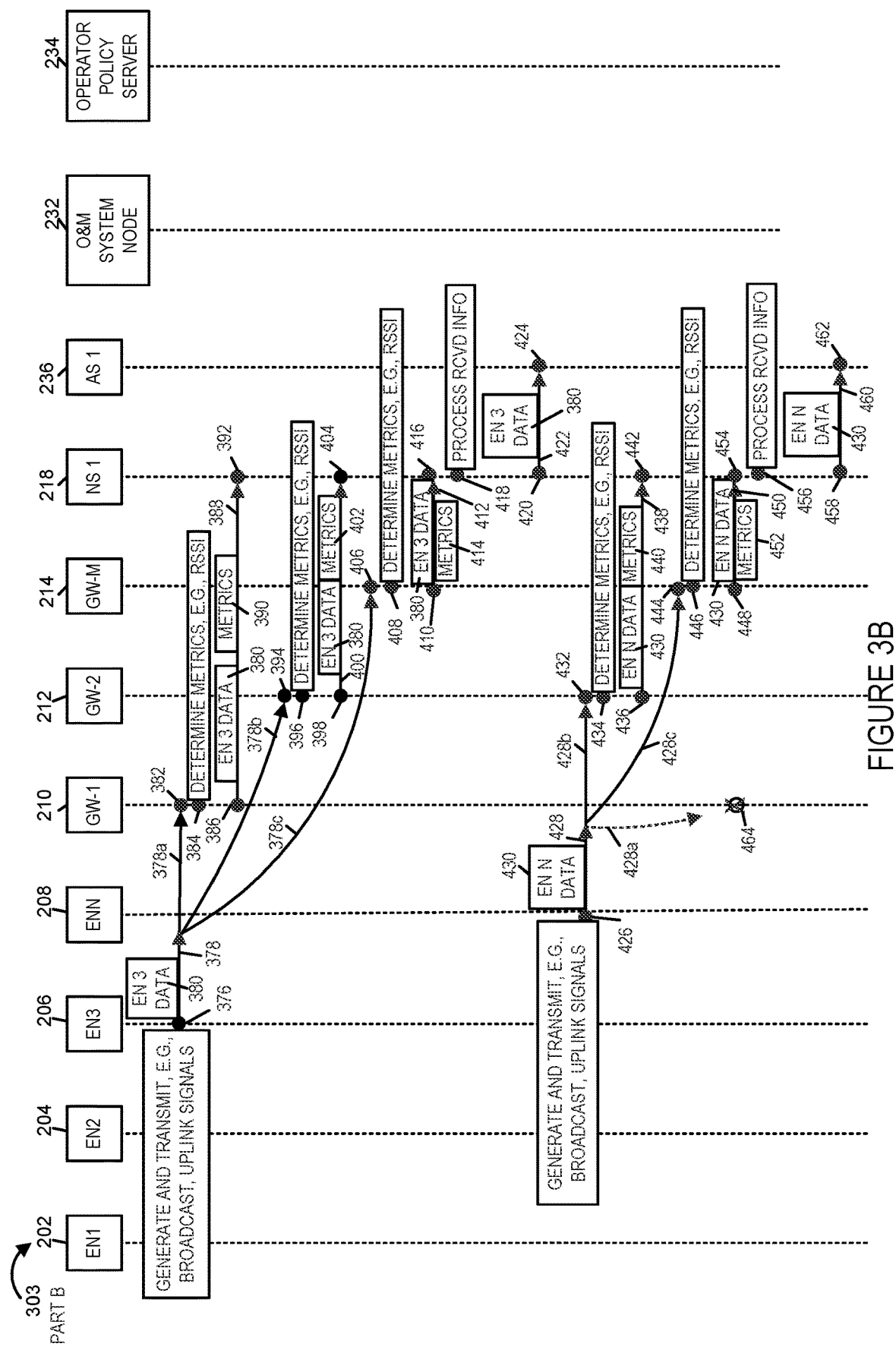
FIG. 3B is second part of an exemplary signaling diagram illustrating an exemplary communications method, said exemplary communication method including the selection of a gateway to be used for downlink communications with an end node based on additional factors in addition to RSSI, in accordance with an exemplary embodiment.
Figure 3C:
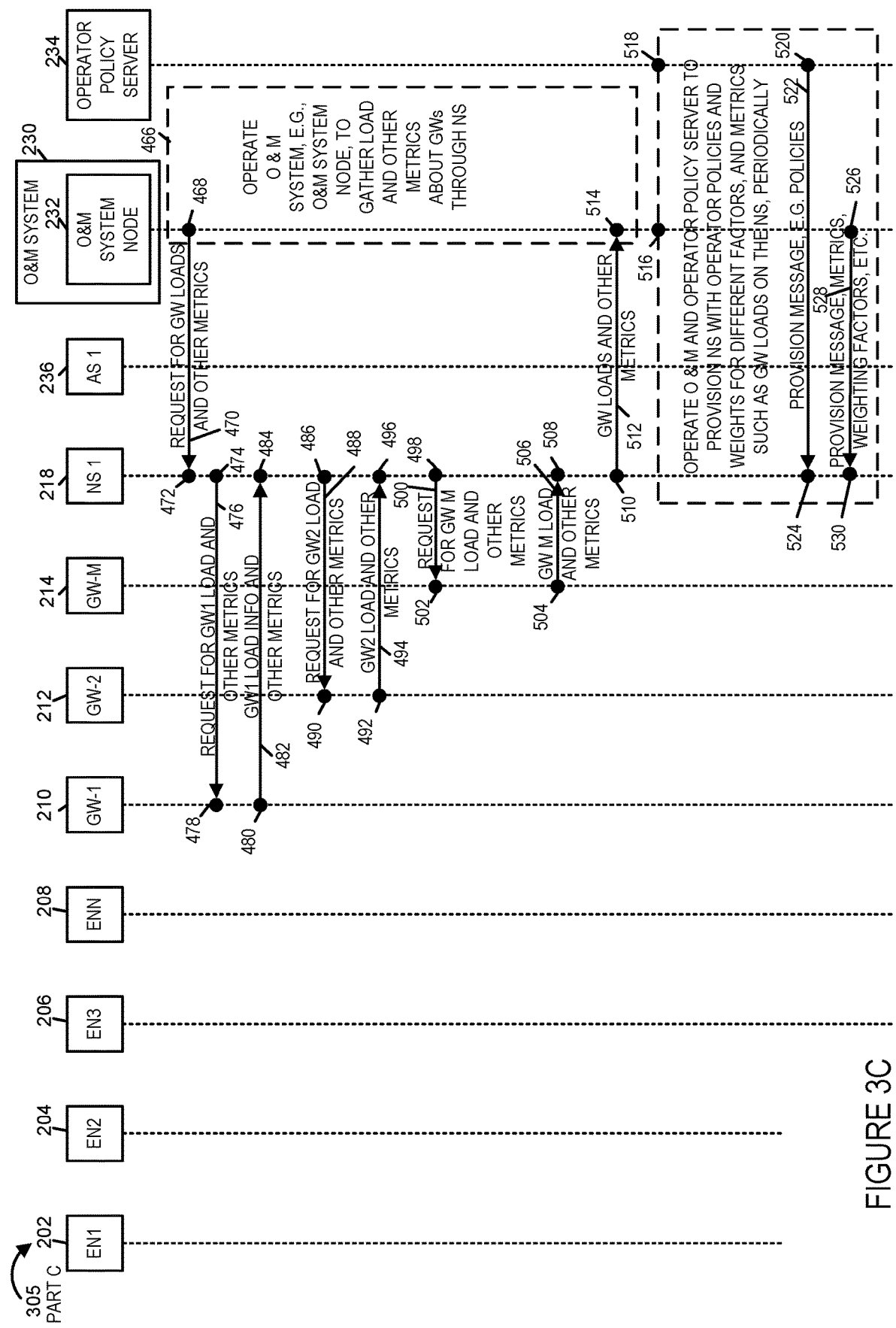
FIG. 3C is third part of an exemplary signaling diagram illustrating an exemplary communications method, said exemplary communication method including the selection of a gateway to be used for downlink communications with an end node based on additional factors in addition to RSSI, in accordance with an exemplary embodiment.
Figure 3D:
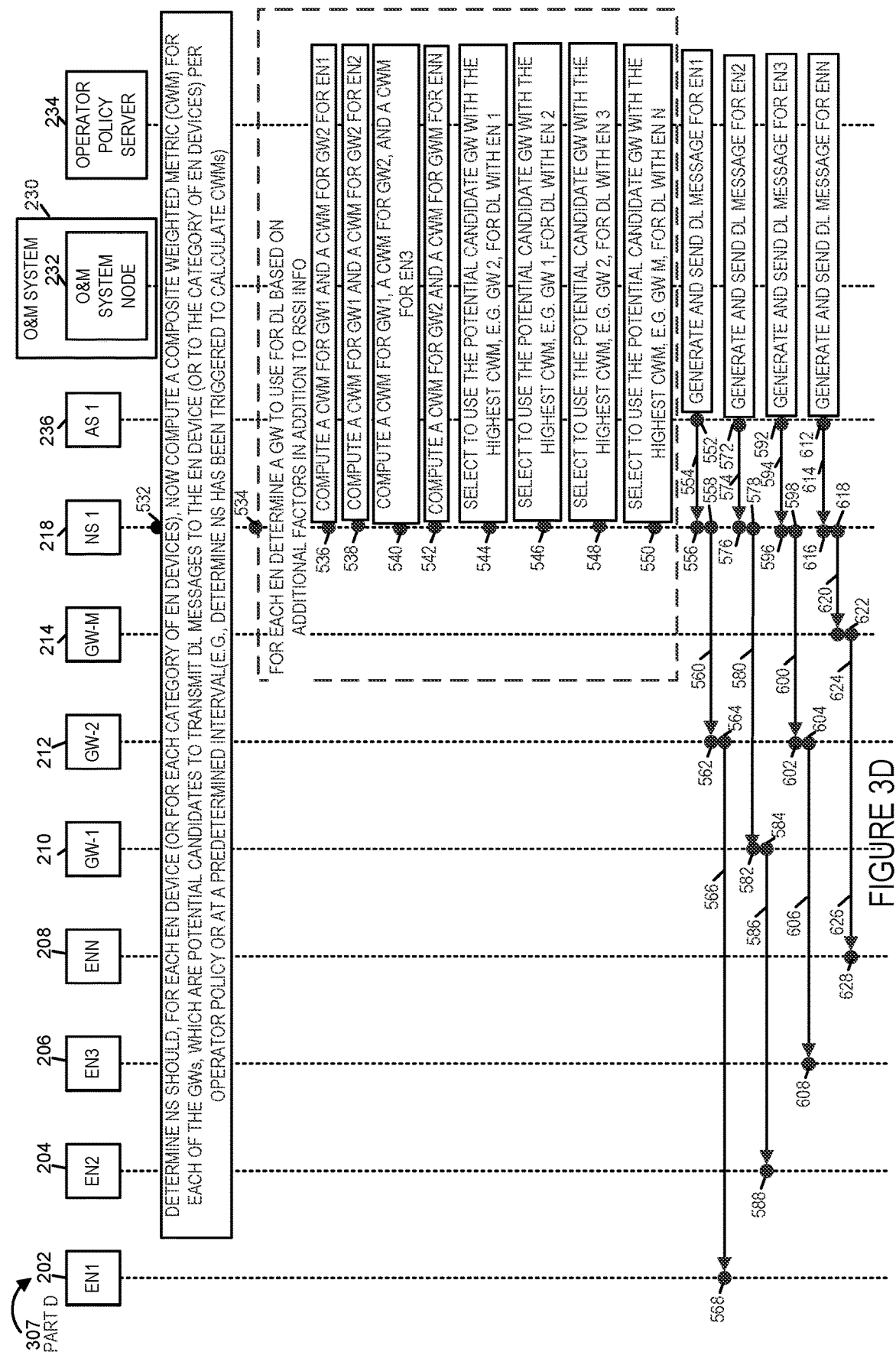
FIG. 3D is fourth part of an exemplary signaling diagram illustrating an exemplary communications method, said exemplary communication method including the selection of a gateway to be used for downlink communications with an end node based on additional factors in addition to RSSI, in accordance with an exemplary embodiment.

FIG. 3, comprising the combination of FIG. 3A, FIG. 3B, FIG. 3C and FIG. 3D, is a signaling diagram 300, comprising the combination of Part A 301, Part B 303, Part C 305 and Part D 306, of an exemplary communications method in accordance with an exemplary embodiment. Signaling diagram 300 illustrates exemplary signaling between various nodes (EN 1 202, EN 2 204, EN 3 206, EN N 208, GW 1 210, GW 2 212, GW M 214, NS 1 218, AS 1 236, O& M system node 232, operator policy server 234) of system 200 of FIG. 2 in accordance with an exemplary embodiment.

In step 302 EN 1 202 generates and transmits, e.g., broadcasts, uplink signals 304 conveying EN1 data 306. Transmitted signals 304 reach GW 1 210, as signals 304a, and in step 308 GW 1 210 successfully receives signals 304a, recovers the communicated information and performs measurements with regard to the received signals. In step 310 GW 1 determines metrics 318 corresponding to the received signals, e.g., received signal strength information, e.g., a received signal strength indicator (RSSI), signal to noise (SNR) information, signal to interference plus noise ratio (SINR) information, receive time tag information, etc. In step 312 GW 1 210 generate and sends message 314 including EN 1 data 306 and metrics 318 to network server 1 (NS 1) 218. In step 320 NS 1 218 receives message 314 and recovers the communicated information.

Transmitted signals 304 reaches GW 2 212, as signals 304b, and in step 322 GW 2 212 successfully receives signals 304b, recovers the communicated information and performs measurements with regard to the received signals. In step 324 GW 2 212 determines metrics 330 corresponding to the received signals, e.g., received signal strength information, e.g., a received signal strength indicator (RSSI), signal to noise (SNR) information, signal to interference plus noise ratio (SINR) information, receive time tag information, etc. In step 326 GW 2 212 generates and sends message 328 including EN 1 data 306 and metrics 330 to network server 1 218. In step 332 NS 1 218 receives message 328 and recovers the communicated information.

Transmitted signals 304 do not reach GW M 214, as indicated by dotted line arrow 304c not reaching GW M 214 and by the X 334 at GW M 214.

In step 336 network server 1 218 processes the received information corresponding to EN 1 202 which was received from GW 1 210 and GW 2 212. In various embodiments step 336 includes storing the received metrics associated with each of the GWs, e.g., to be communicated to the O&M system and/or to be used by the NS 1 218, at a later point in time. In step 338 NS 1 218 generates and sends message 340 including EN 1 data 306, to application server 1 236. In step 342 AS 1 236 receives message 340 and recovers the communicated EN 1 data 306.

In step 344 EN 2 204 generates and transmits, e.g., broadcasts, uplink signals 346 conveying EN 2 data 348. Transmitted signals 346 reach GW 1 210, as signals 346a, and in step 348 GW 1 210 successfully receives signals 346a, recovers the communicated information and performs measurements with regard to the received signals. In step 349 GW 1 210 determines metrics 351 corresponding to the received signals, e.g., received signal strength information, e.g., a received signal strength indicator (RSSI), signal to noise (SNR) information, signal to interference plus noise ratio (SINR) information, receive time tag information, etc. In step 350 GW 1 210 generate and sends message 352 including EN 2 data 348 and metrics 351 to network server 1 218. In step 353 NS 1 218 receives message 352 and recovers the communicated information.

Transmitted signals 346 reach GW 2 212, as signals 346b, and in step 354 GW 2 212 successfully receives signals 346b, recovers the communicated information and performs measurements with regard to the received signals. In step 356 GW 2 212 determines metrics 362 corresponding to the received signals, e.g., received signal strength information, e.g., a received signal strength indicator (RSSI), signal to noise (SNR) information, signal to interference plus noise ratio (SINR) information, receive time tag information, etc. In step 358 GW 2 212 generates and sends message 360 including EN 2 data 348 and metrics 362 to network server 1 218. In step 362 NS 1 218 receives message 360 and recovers the communicated information.

Transmitted signals 346 do not reach GW M 214, as indicated by dotted line arrow 346c not reaching GW M 214 and by the X 366 at GW M 214.

In step 368 network server 1 218 processes the received information corresponding to EN 2 204 which was received from GW 1 210 and GW 2 212. In various embodiments step 358 includes storing the received metrics associated with each of the GWs, e.g., to be communicated to the O&M system and/or to be used by the NS 1 218, at a later point in time. In step 370 NS 1 218 generates and sends message 372 including EN 2 data 348, to application server 1 236. In step 374 AS 1 236 receives message 340 and recovers the communicated EN 2 data 348.

In step 376 EN 3 206 generates and transmits, e.g., broadcasts, uplink signals 378 conveying EN3 data 380. Transmitted signals 378 reach GW 1 210, as signals 378a, and in step 382 GW 1 210 successfully receives signals 378a, recovers the communicated information and performs measurements with regard to the received signals. In step 384 GW 1 210 determines metrics 390 corresponding to the received signals, e.g., received signal strength information, e.g., a received signal strength indicator (RSSI), signal to noise (SNR) information, signal to interference plus noise ratio (SINR) information, receive time tag information, etc. In step 386 GW 1 210 generate and sends message 388 including EN 3 data 380 and metrics 390 to network server 1 218. In step 392 NS 1 218 receives message 388 and recovers the communicated information.

Transmitted signals 378 reach GW 2 212, as signals 378b, and in step 394 GW 2 212 successfully receives signals 378b, recovers the communicated information and performs measurements with regard to the received signals. In step 396 GW 2 212 determines metrics 402 corresponding to the received signals, e.g., received signal strength information, e.g., a received signal strength indicator (RSSI), signal to noise (SNR) information, signal to interference plus noise ratio (SINR) information, receive time tag information, etc. In step 398 GW 2 212 generates and sends message 400 including EN 3 data 380 and metrics 402 to network server 1 218. In step 404 NS 1 218 receives message 400 and recovers the communicated information.

Transmitted signals 378 reach GW M 214, as signals 378c, and in step 406 GW M 214 successfully receives signals 378c, recovers the communicated information and performs measurements with regard to the received signals. In step 408 GW M 214 determines metrics 414 corresponding to the received signals, e.g., received signal strength information, e.g., a received signal strength indicator (RSSI), signal to noise (SNR) information, signal to interference plus noise ratio (SINR) information, receive time tag information, etc. In step 410 GW M 214 generates and sends message 412 including EN 3 data 380 and metrics 414 to network server 1 218. In step 416 NS 1 218 receives message 412 and recovers the communicated information.

In step 418 network server 1 218 processes the received information corresponding to EN 3 206 which was received from GW 1 210, GW 2 212 and GW M 214. In various embodiments step 418 includes storing the received metrics associated with each of the GWs, e.g., to be communicated to the O&M system and/or to be used by the NS 1 218, at a later point in time. In step 420 NS 1 218 generates and sends message 422 including EN 3 data 380, to application server 1 236. In step 424 AS 1 236 receives message 422 and recovers the communicated EN 3 data 380.

In step 426 EN N 208 generates and transmits, e.g., broadcasts, uplink signals 428 conveying EN N data 430. Transmitted signals 428 reaches GW 2 212, as signals 428b, and in step 432 GW 2 212 successfully receives signals 428*b*, recovers the communicated information and performs measurements with regard to the received signals. In step 436 GW 2 212 determines metrics 440 corresponding to the received signals, e.g., received signal strength information, e.g., a received signal strength indicator (RSSI), signal to noise (SNR) information, signal to interference plus noise ratio (SINR) information, receive time tag information, etc. In step 436 GW 2 212 generate and sends message 438 including EN N data 430 and metrics 440 to network server 1 218. In step 442 NS 1 218 receives message 438 and recovers the communicated information.

Transmitted signals 428 reach GW M 214, as signals 428*c*, and in step 444 GW M 214 successfully receives signals 428*c*, recovers the communicated information and performs measurements with regard to the received signals. In step 446 GW M 214 determines metrics 452 corresponding to the received signals, e.g., received signal strength information, e.g., a received signal strength indicator (RSSI), signal to noise (SNR) information, signal to interference plus noise ratio (SINR) information, receive time tag information, etc. In step 448 GW M 214 generates and sends message 450 including EN N data 430 and metrics 452 to network server 1 218. In step 454 NS 1 218 receives message 450 and recovers the communicated information.

Transmitted signals 428 do not reach GW 1 210, as indicated by dotted line arrow 428*a* not reaching GW 1 210 and by the X 464 at GW 1 210.

In step 456 network server 1 218 processes the received information corresponding to EN N 208 which was received from GW 2 212 and GW M 214. In various embodiments step 456 includes storing the received metrics associated with each of the GWs, e.g., to be communicated to the O&M system and/or to be used by the NS 1 218, at a later point in time. In step 458 NS 1 218 generates and sends message 460 including EN N data 430, to application server 1 236. In step 462 AS 1 236 receives message 460 and recovers the communicated EN N data 430.

In step 466 the O&M system 230, e.g., the O&M system node 232, is operated to gather load and other metrics about GWs through network server 1 218. Step 466 includes steps 468 and 514, which are performed by O&M system node 232. In step 468 the O&M system node 232 generates and sends a request 470 for GW loads and other metrics to network server 1 218. In step 472 network server 1 218 receives the request 472, and in response, the network server 218 generates and sends a request for GW load and metrics to each of the GWs. In step 474 the network server 218 generates and sends a request 476 for GW 1 load and other metrics to GW 1 210. In step 478, GW 1 210 receives the request 476, and in response, in step 480, GW 1 210 generates and sends response message 482 communicating GW 1 load information and other metrics to network server 218. In step 484 network server 218 receives response message 482 and recovers the communicated information. In step 486 the network server 218 generates and sends a request 488 for GW 2 load and other metrics to GW 2 212. In step 490, GW 2 212 receives the request 488, and in response, in step 492, GW 2 212 generates and sends response message 494 communicating GW 2 load information and other metrics to network server 218. In step 496 network server 218 receives response message 494 and recovers the communicated information. In step 498 the network server 218 generates and sends a request 500 for GW M load and other metrics to GW M 214. In step 502, GW M 214 receives the request 500, and in response, in step 504, GW M 210 generates and sends response message 506 communicating GW M load information and other metrics to network server 218. In step 508 network server 218 receives response message 506 and recovers the communicated information.

In step 510 network server 218 aggregates the information received from response messages 482, 488, and 506, generates message 512 conveying GW loads and other metrics, and sends message 512 to O&M system node 232. In step 514, the O&M system node receives message 512, recovers the communicated information, and processes and stores the recovered information.

In steps 516 and 518, the O&M system 230 including O&M node 232 and the operator policy server 234 are operated to provision the network server 218 with operator policies and weights for different factors, and metrics such as GW loads on the NS, periodically. In step 520 the operator policy server 234 generates and sends a provision message 522, e.g., including policies, black lists, white lists, red lists, rules, etc., to the network server 218. In step 524, the network server 218 receives the provision message 522 and recovers the communicated information. In step 526 the O&M system node 232 generates and sends provision message 528, e.g. including metrics, weighting factors, etc., to the network server 218. In step 530 the network server 218 receives the provision message 528 and recovers the communicated information. In various embodiments, the provision messages 520, 528 include provisioning information corresponding to individual end nodes. In some embodiments, the provision messages 520, 528 include provisioning information corresponding to group of end nodes, e.g. different types of end nodes, e.g., different groups of end nodes running different applications. In various embodiments, the provisioning information is subsequently used by the network server 218 to select a gateway to be used for downlink transmissions for an EN, e.g. to compute composite weighted metrics for each of a plurality of alternative candidate gateways (with regard to downlink transmission) for the EN device, and then the GW with the best CWM is selected by the network server to be used for the EN. Different sets of CWM are calculated and determined for each EN device.

In step 532, the network server 218 determines that the network server 218 should for each EN device (or for each category of EN devices), now compute a composite weighted metric (CWM) for each of the gateways, which are potential candidates to transmit downlink messages to the EN device (or category of EN devices) per operator policy or at a predetermined time interval, e.g., in step 532 network server 218 determines that the NS has been triggered to calculate CWMs.

In step 534, the network server 218 determines, for each end node (or for each category of EN devices), a gateway to use for downlink based on additional factors, e.g., GW message loading, number of EN devices, number of EN devices transmitting during a time interval or interest, SNR, loading between the GWs and NS, delay times, associations with particular service providers, types of applications, priority of applications, etc., in addition to RSSI information. In some embodiments, the NS 218 may, and sometimes does, decide, that a downlink is not to be provided to a particular EN device, e.g. the EN device is blacklisted for being a rogue node or a defective node, or the EN is not allowed to communicate during the current time interval. Step 534 includes steps 536, 538, 540, 542, 544, 546, 548, and 550. In step 536 the network server 218 computes a composite weighted metric (CWM) for GW1 210 and a CWM for GW 2 212 for end node 1 (EN 1) 202. In step 538 the network server 218 computes a CWM for GW1 210 and a CWM for GW 2 212 for end node 2 (EN 2) 204. In step 538 the network server 218 computes a CWM for GW1 210, a CWM for GW2 212, and a CWM for GW M 214 for end node 3 (EN 3) 206. In step 542 the network server 218 computes a CWM for GW2 212 and a CWM for GW M 214 for end node N (EN N) 208. In step 544 NS 218 selects to use the potential candidate gateway with the highest CWM, e.g., GW 2 212, for downlink communication with EN 1 202, based on the results of step 536, and stores information identifying the selected gateway to be used for DL communication with EN 1 202. In step 546 NS 218 selects to use the potential candidate gateway with the highest CWM, e.g., GW 1 210, for downlink communication with EN 2 204, based on the results of step 538, and stores information identifying the selected gateway to be used for DL communication with EN 2 204. In step 548 NS 218 selects to use the potential candidate gateway with the highest CWM, e.g., GW 2 212, for downlink communication with EN 3 206, based on the results of step 540, and stores information identifying the selected gateway to be used for DL communication with EN 3 206. In step 550 NS 218 selects to use the potential candidate gateway with the highest CWM, e.g., GW M 214, for downlink communication with EN N 206, based on the results of step 542, and stores information identifying the selected gateway to be used for DL communication with EN N 208.

In step 552, application server 1 (AS 1) 236 generates and sends a DL message 554 for EN 1 202 to network server 1 (NS 1) 218. In step 556, NS 1 218 receives message 554, recovers the communicated information, determines that the message 554 is intended to be delivered to EN 1 202, and determines, e.g. via a stored look-up table, that the currently selected GW to be used for communicating downlink messages to EN 1 202 is GW 2 212. In step 558, NS 1 218 generates and sends message 560, which is, e.g., a forwarded version of message 554 including the payload of message 554, to GW 2 212. In step 562 GW 2 212 receives message 560 and recovers the communicated information. In step 564 GW 2 212 generates and transmits wireless downlink signals 566 conveying the payload of message 554 to EN 1 202. In step 568 EN 1 202 receives downlink signals 566 and recovers the payload which was sent from AS 1 236.

In step 572, application server 1 (AS 1) 236 generates and sends a DL message 574 for EN 2 204 to network server 1 (NS 1) 218. In step 576, NS 1 218 receives message 574, recovers the communicated information, determines that the message 574 is intended to be delivered to EN 2 204, and determines, e.g. via a stored look-up table, that the currently selected GW to be used for communicating downlink messages to EN 2 204 is GW 1 210. In step 578, NS 1 218 generates and sends message 580, which is, e.g., a forwarded version of message 574 including the payload of message 574, to GW 1 210. In step 582 GW 1 210 receives message 580 and recovers the communicated information. In step 584 GW 1 210 generates and transmits wireless downlink signals 586 conveying the payload of message 574 to EN 2 204. In step 588 EN 2 204 receives downlink signals 586 and recovers the payload which was sent from AS 1 236.

In step 592, application server 1 (AS 1) 236 generates and sends a DL message 594 for EN 3 206 to network server 1 (NS 1) 218. In step 596, NS 1 218 receives message 594, recovers the communicated information, determines that the message 594 is intended to be delivered to EN 3 204, and determines, e.g. via a stored look-up table, that the currently selected GW to be used for communicating downlink messages to EN 2 204 is GW 2 212. In step 598, NS 1 218 generates and sends message 600, which is, e.g., a forwarded version of message 594 including the payload of message 594, to GW 2 212. In step 602 GW 2 212 receives message 600 and recovers the communicated information. In step 604 GW 2 212 generates and transmits wireless downlink signals 606 conveying the payload of message 594 to EN 3 206. In step 608 EN 3 206 receives downlink signals 606 and recovers the payload which was sent from AS 1 236.

In step 612, application server 1 (AS 1) 236 generates and sends a DL message 614 for EN N 208 to network server 1 (NS 1) 218. In step 616, NS 1 218 receives message 614, recovers the communicated information, determines that the message 614 is intended to be delivered to EN N 208, and determines, e.g. via a stored look-up table, that the currently selected GW to be used for communicating downlink messages to EN N 208 is GW M 214. In step 618, NS 1 218 generates and sends message 620, which is, e.g., a forwarded version of message 614 including the payload of message 614, to GW M 214. In step 622 GW M 214 receives message 620 and recovers the communicated information. In step 624 GW M 214 generates and transmits wireless downlink signals 626 conveying the payload of message 614 to EN N 208. In step 628 EN N 226 receives downlink signals 626 and recovers the payload which was sent from AS 1 236.

Figure 4:
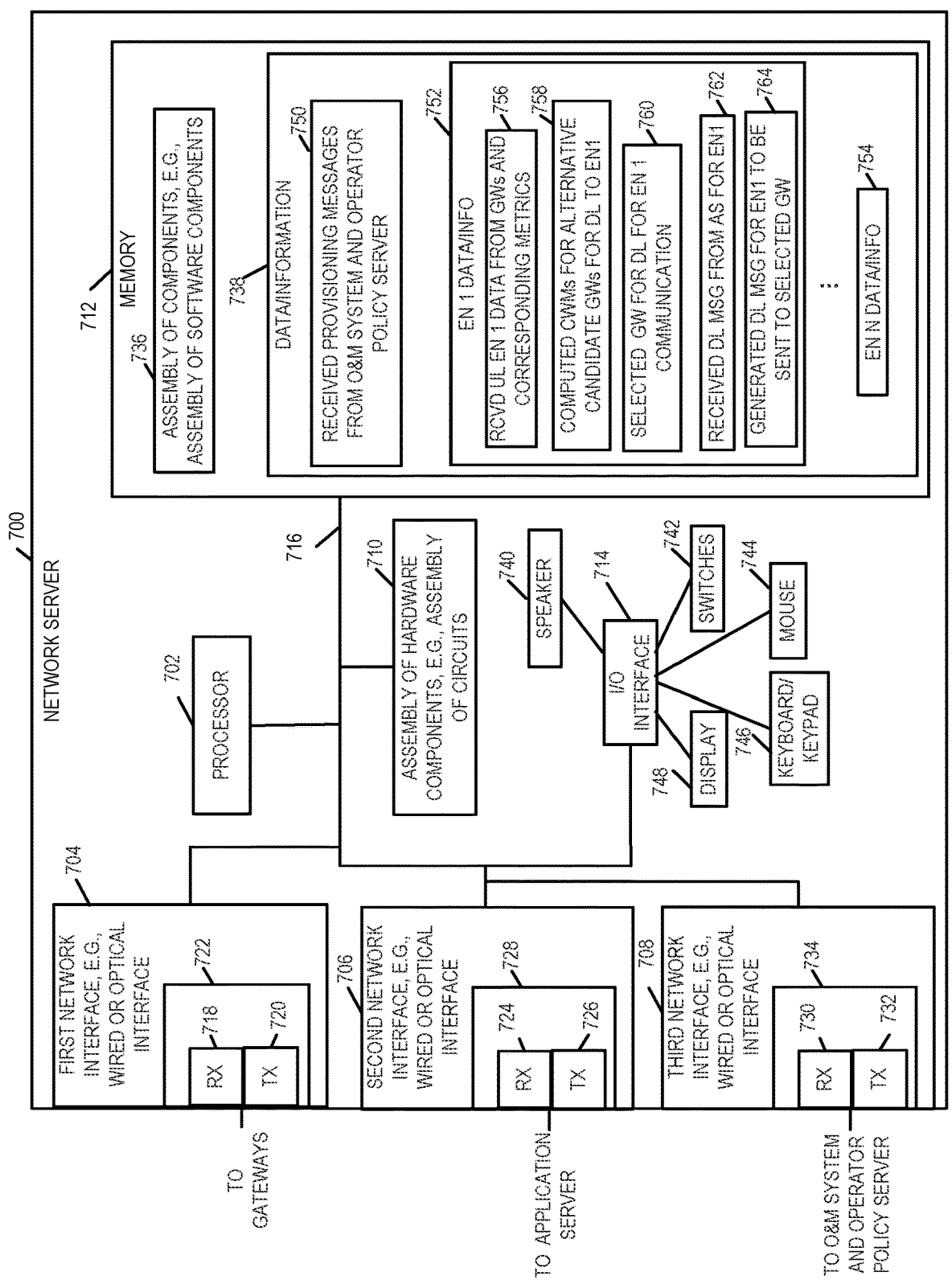
FIG. 4 is a drawing of an exemplary network server implemented in accordance with an exemplary embodiment.

FIG. 4 is a drawing of an exemplary network server 700 implemented in accordance with an exemplary embodiment. Exemplary network server 700 is, e.g., network server 218 of FIGS. 2 and 3. Exemplary network server 700 includes a processor 702, e.g., a CPU, a first network interface 704, e.g., a wired or optical interface, a second network interface 706, e.g., a wired or optical interface, a third network interface 708, e.g., a wired or optical interface, an assembly of hardware components 710, e.g., an assembly of circuits, memory 712, and an I/O interface 714 coupled together via a bus 716 over which the various elements may interchange data and information. First network interface 704 includes a receiver 718 and a transmitter 720. In some embodiments, receiver 718 and transmitter 720 are included as part of a transceiver 722. First network interface 704 couples the network server 700, to gateways. Second network interface 706 includes a receiver 724 and a transmitter 726. In some embodiments, receiver 724 and transmitter 726 are included as part of a transceiver 728. Second network interface 706 couples the network server 700 to one or more application server(s) such as AS 236, AS 238 and AS 240. Third network interface 708 includes a receiver 730 and a transmitter 732. In some embodiments, receiver 730 and transmitter 732 are included as part of a transceiver 734. Third network interface 708 couples the network server 700 to an O&M system and to an operator policy server, e.g., O&M system 230 and operator policy server 234. In some embodiments, there is a single network interface which performs the functionality of first, second and third network interfaces 704, 706 and 708.

Network server 700 further includes a plurality of input/output devices (speaker 740, switches 742, mouse 744, keyboard/keypad 746 and display 748, which are coupled to I/O interface 714 allowing the various I/O devices to communicate with other elements coupled to bus 716.

Memory 710 includes an assembly of components 736, e.g., an assembly of software components, and data/information 738. Data/information 738 includes received provisioning messages 750 from the O&M system and from the operator policy server, and sets of data/information corresponding to a plurality of ENs (EN 1 data information 752, . . . , EN N data information 754). EN 1 data information 752 includes received UL EN 1 data from GWs and corresponding metrics e.g., RSSI, SNR, time tag info, etc.

756, computed composite weighted metrics (CWMs) for alternative candidate GWs for DL to EN 1 758, selected gateway (GW) for downlink (DL) for EN 1 communication 760, a received DL messages from an application server (AS) for EN 1 including a payload 762, and a generated DL message for EN 1 to be sent to the selected GW including said payload 764.

Figure 5:
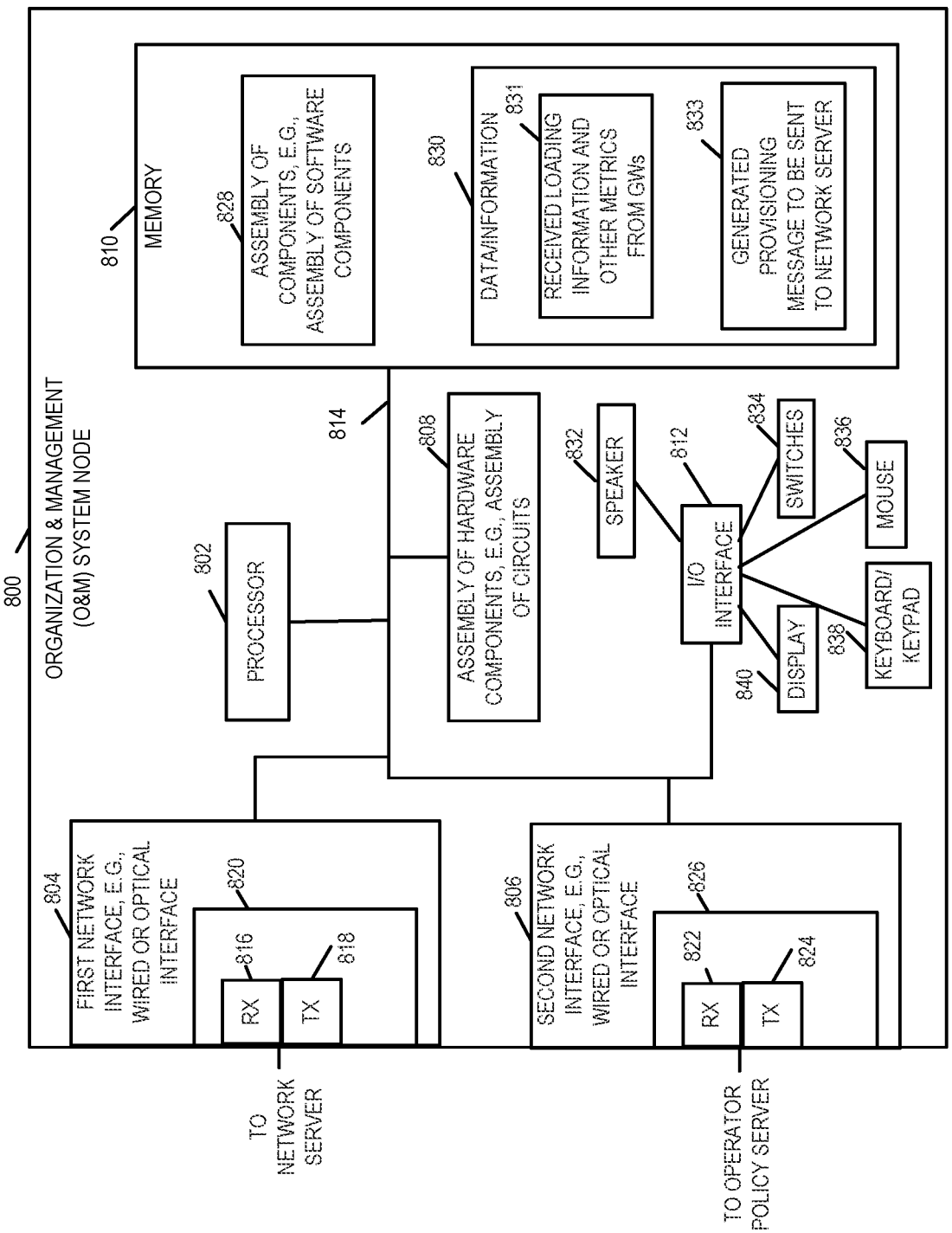
FIG. 5 is a drawing of an exemplary Organization and Management (O&M) system node implemented in accordance with an exemplary embodiment.

FIG. 5 is a drawing of an exemplary Organization and Management (O&M) system node 800 implemented in accordance with an exemplary embodiment. Exemplary O&M system node 800 is, e.g., O&M system node 232 of FIGS. 2 and 3. Exemplary O&M system node 800 includes a processor 802, e.g., a CPU, a first network interface 804, e.g., a wired or optical interface, a second network interface 806, e.g., a wired or optical interface, an assembly of hardware components 808, e.g., an assembly of circuits, a memory 810, and an I/O interface 812 coupled together via a bus 814 over which the various elements may interchange data and information. First network interface 804 includes a receiver 816 and a transmitter 818. In some embodiments, receiver 816 and transmitter 818 are included as part of a transceiver 820. First network interface 804 couples the O&M system node 800, to a network server. Second network interface 806 includes a receiver 822 and a transmitter 824. In some embodiments, receiver 822 and transmitter 824 are included as part of a transceiver 826. Second network interface 806 couples the O&M system node 800 to an operator policy server such as operator policy server 234. In some embodiments, there is a single network interface which performs the functionality of first and second network interfaces 704 and 706.

O&M system node 800 further includes a plurality of input/output devices (speaker 832, switches 834, mouse 836, keyboard/keypad 838 and display 840, which are coupled to I/O interface 812 allowing the various I/O devices to communicate with other elements coupled to bus 814.

Memory 810 includes an assembly of components 828, e.g., an assembly of software components, and data/information 830. Data/information 830 includes received loading information and other metrics from gateways 831 and generated provisioning messages to be sent to a network server 833.

Figure 6:
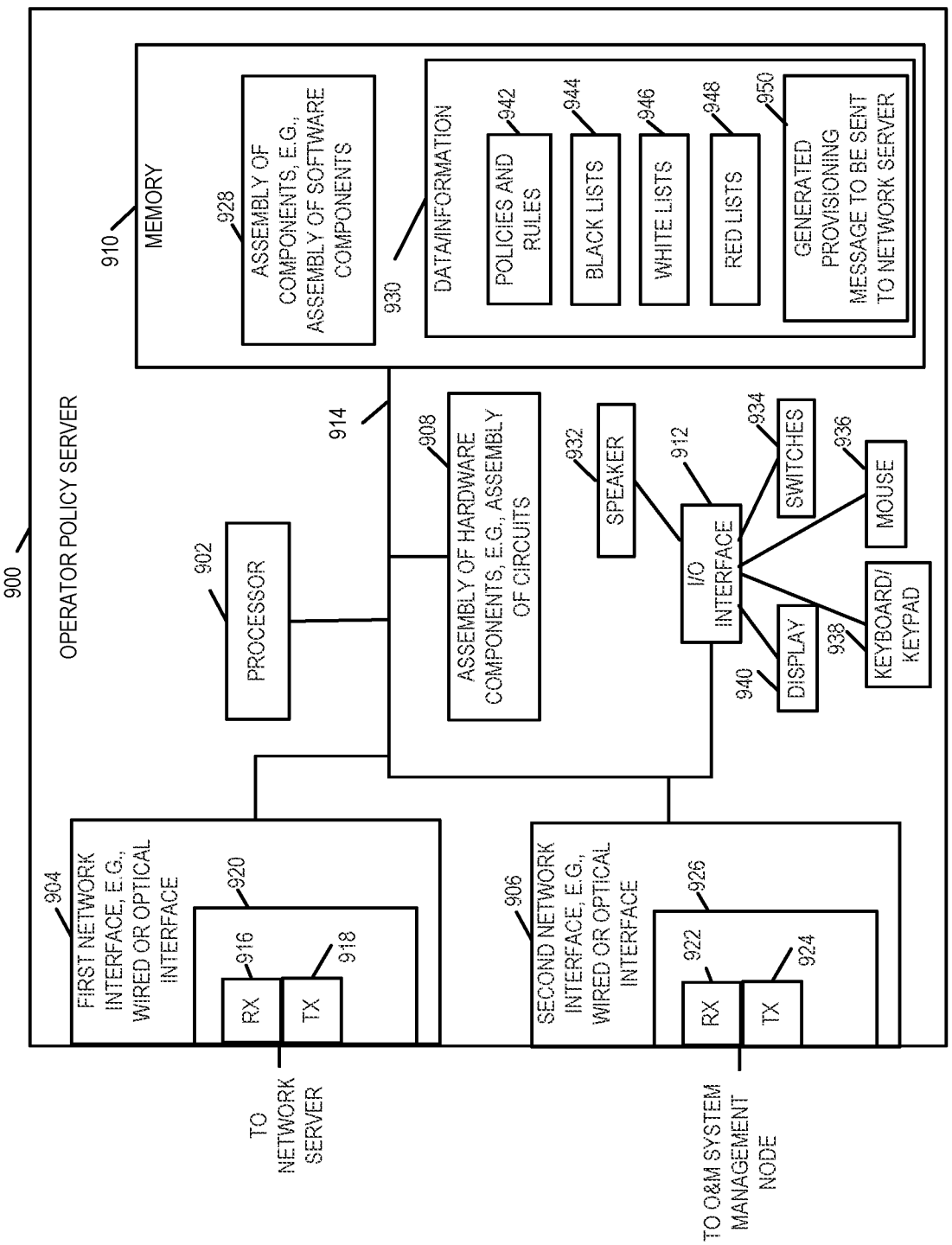
FIG. 6 is a drawing of an exemplary Operation and Policy server implemented in accordance with an exemplary embodiment.

FIG. 6 is a drawing of an exemplary operator and policy server 900 implemented in accordance with an exemplary embodiment. Exemplary operator and policy server 900 is, e.g., operator and policy server 234 of FIGS. 2 and 3. Exemplary operator and policy server 900 includes a processor 902, e.g., a CPU, a first network interface 904, e.g., a wired or optical interface, a second network interface 906, e.g., a wired or optical interface, an assembly of hardware components 908, e.g., an assembly of circuits, a memory 910, and an I/O interface 912 coupled together via a bus 914 over which the various elements may interchange data and information. First network interface 904 includes a receiver 916 and a transmitter 918. In some embodiments, receiver 916 and transmitter 918 are included as part of a transceiver 920. First network interface 904 couples the operator and policy server 900 to a network server, e.g., NS 218. Second network interface 906 includes a receiver 922 and a transmitter 924. In some embodiments, receiver 922 and transmitter 8924 are included as part of a transceiver 926. Second network interface 906 couples the operator and policy server 900 to an O&M system management node such as O&M system management node 232. In some embodiments, there is a single network interface which performs the functionality of first and second network interfaces 904 and 906.

Operator and policy server 900 further includes a plurality of input/output devices (speaker 932, switches 934, mouse 936, keyboard/keypad 938 and display 940, which are coupled to I/O interface 912 allowing the various I/O devices to communicate with other elements coupled to bus 914.

Memory 910 includes an assembly of components 928, e.g., an assembly of software components, and data/information 930. Data/information 930 includes policies and rules 942, blacklists 944, e.g., lists of ENs or applications not allowed to use certain gateways with regard to DL communications, whitelists 946, e.g., lists of ENs or applications allowed to used gateways with regard to DL communication, redlists 948, e.g., lists of ENs or applications allowed to conditionally use specific gateways subject to a set of conditions, e.g., time, space (location), load conditions, channel conditions, etc., and generated provisioning messages to be sent to a network server 950.

Figure 7:
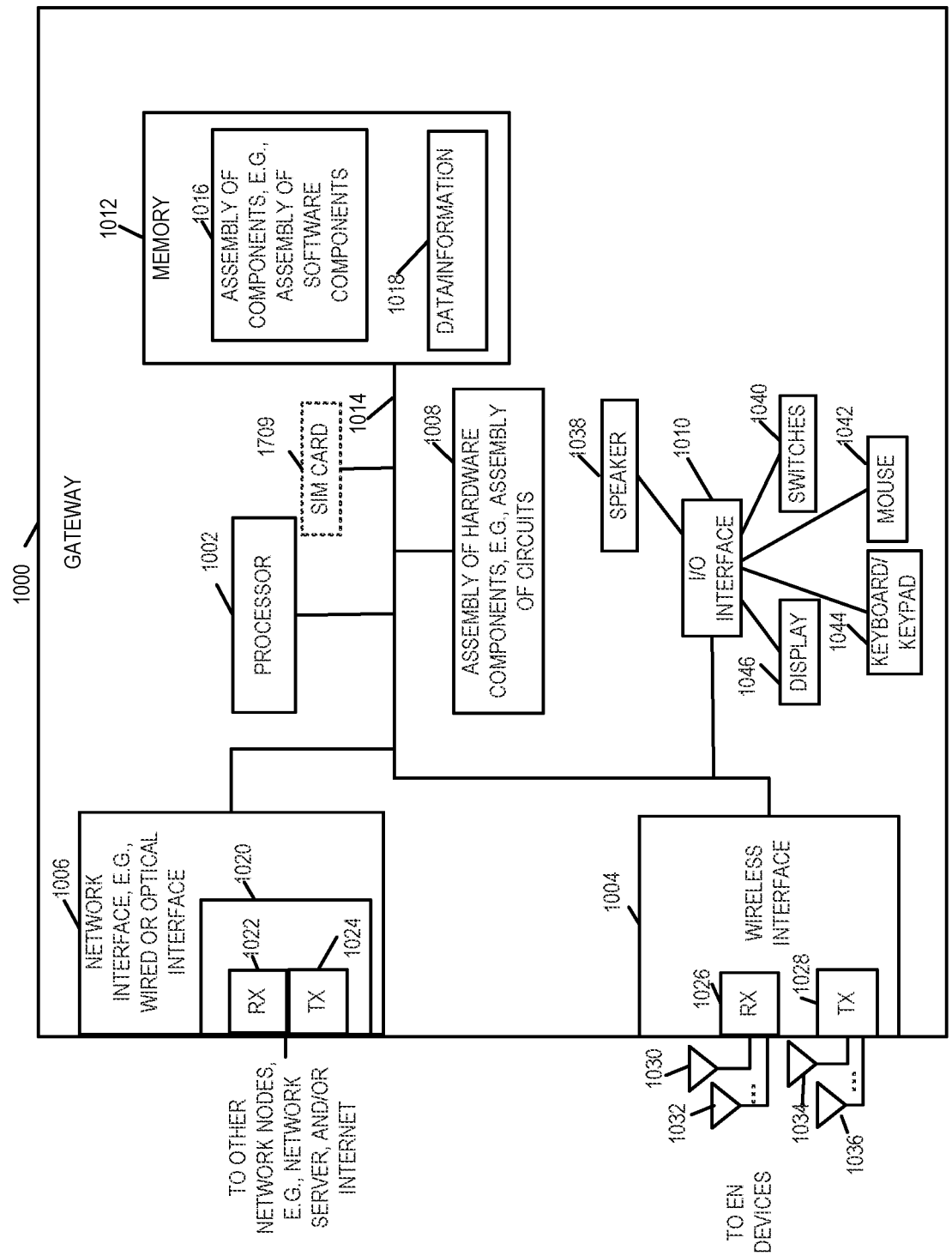
FIG. 7 is a drawing of an exemplary gateway implemented in accordance with an exemplary embodiment.

FIG. 7 is a drawing of an exemplary gateway (GW) 1000, e.g., a GW supporting wireless communications with a plurality of end node (EN) devices, e.g., Internet of Things (IoT) EN devices, as part of wireless access in a wide area network (WAN), implemented in accordance with an exemplary embodiment. Exemplary gateway 1000 is, e.g. one of the gateways (210, 212 . . . , 214) of FIGS. 2 and 3. Exemplary gateway 1000 includes a processor 1002, e.g., a CPU, a wireless interface 1004, a network interface 1006, e.g., a wired or optical interface, an I/O interface 1010, an assembly of hardware components 1008, e.g., an assembly of circuits, a memory 1012, and in some embodiments, a SIM card 1009, coupled together via a bus 1014 over which the various elements may interchange data and information. Wireless interface 1004 includes a wireless receiver 1026 coupled to one or more receive antennas 1030, . . . 1032, via which the gateway receives wireless signals, e.g. broadcast signals from EN devices, e.g. EN IoT devices, and a wireless transmitter 1028 coupled to one or more transmit antennas 1034, . . . 1036, via which the gateway transmits wireless signals, e.g. downlink signals, to EN devices, e.g. EN IoT devices. In some embodiments, the same antenna(s) are used for both transmit and receive. Network interface 1006 includes a receiver 1022 and a transmitter 1024. In some embodiments, receiver 1022 and transmitter 1024 are included as part of a transceiver 1020. Network interface 1006 couples the gateway 1000, e.g. to other network nodes, e.g, a network server such as NS 1 218 and/or the Internet.

Gateway 1000 further includes a plurality of input/output devices (speaker 1038, switches 1040, mouse 1042, keyboard/keypad 1044 and display 1046, which are coupled to I/O interface 1010 allowing the various I/O devices to communicate with other elements coupled to bus 1014.

Memory 1012 includes an assembly of components 1016, e.g., an assembly of software components, and data/information 1018.

Figure 8:
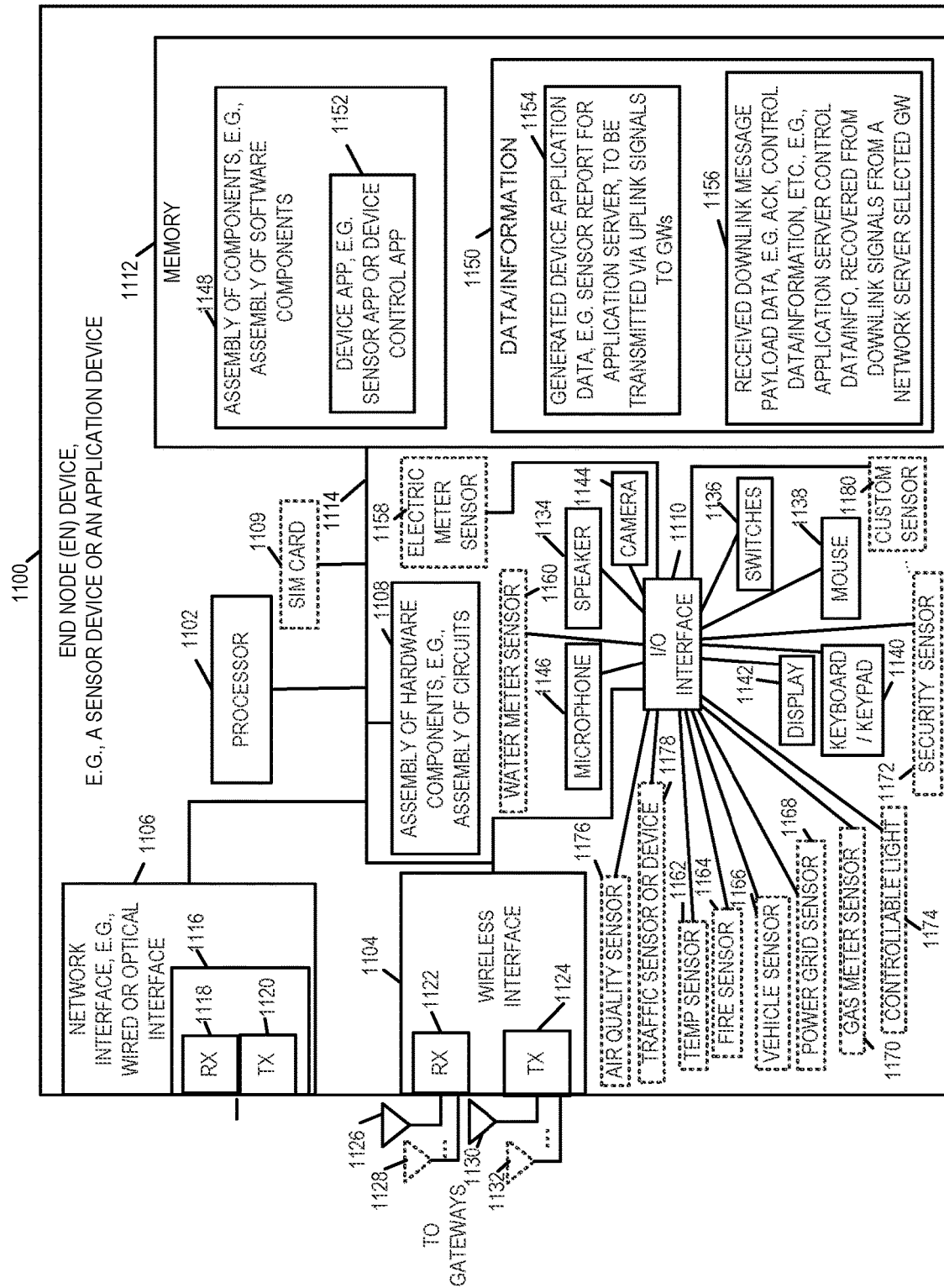
FIG. 8 is a drawing of an exemplary end node (EN) device implemented in accordance with an exemplary embodiment.

FIG. 8 is a drawing of an exemplary end node (EN) device 1100, e.g. a sensor device or an application device, implemented in accordance with an exemplary embodiment. Exemplary EN device 1100 is, e.g., any of the EN devices (202, 204, . . . , 208) of FIGS. 2 and 3. Exemplary EN device 1100 includes a processor 1102, e.g., a CPU, a wireless interface 1104, a network interface 1106, e.g., a wired or optical interface, an I/O interface 1110, an assembly of hardware components 1108, e.g., an assembly of circuits, memory 1112, and in some embodiments, SIM card 1109, coupled together via a bus 1114 over which the various elements may interchange data and information. Wireless interface 1104 includes a wireless receiver 1122 coupled to one or more receive antennas 1126, . . . , 1128, and a wireless transmitter 1124 coupled to one or more transmit antennas 1130, . . . , 1132. In some embodiments, the same antenna(s) are used for transmit and receive. Network interface 1104 includes a receiver 1118 and a transmitter 1120. In some embodiments, receiver 1118 and transmitter 1120 are included as part of a transceiver 1116.

End node (EN) device 1100 further includes a plurality of input/output devices (speaker 1134, switches 1136, mouse 1138, keyboard/keypad 1140, display 1142, camera 1144, microphone 1146, and one or more of: temperature sensor 1162, fire sensor 1164, vehicle sensor 1166, water meter sensor 1160, electric meter sensor 1158, power grid sensor 1168, gas meter sensor 1170, security sensor 1172, air quality sensor 1176, traffic sensor or device 1178, . . . , custom sensor 1180) which are coupled to I/O interface 1110 allowing the various I/O devices to communicate with other elements coupled to bus 1114.

Memory 1112 includes an assembly of components 1148, e.g., an assembly of software components and data/information 1150. Assembly of components 1148 includes a device app 1152, e.g., a sensor app or device control app 1152. Data/information 1150 includes generated device application data 1154, e.g., a sensor report for an application server, to be transmitted via uplink signals, e.g., broadcast uplink signals, to one or more gateways which are able to successfully recover the uplink signals, and received downlink message payload data, e.g., an ACK, control data/information, etc., e.g., application server control data/information, recovered from downlink signals for the EN, which were transmitted from a network server selected gateway, which is being used to provide a DL for the EN.

Figure 9:
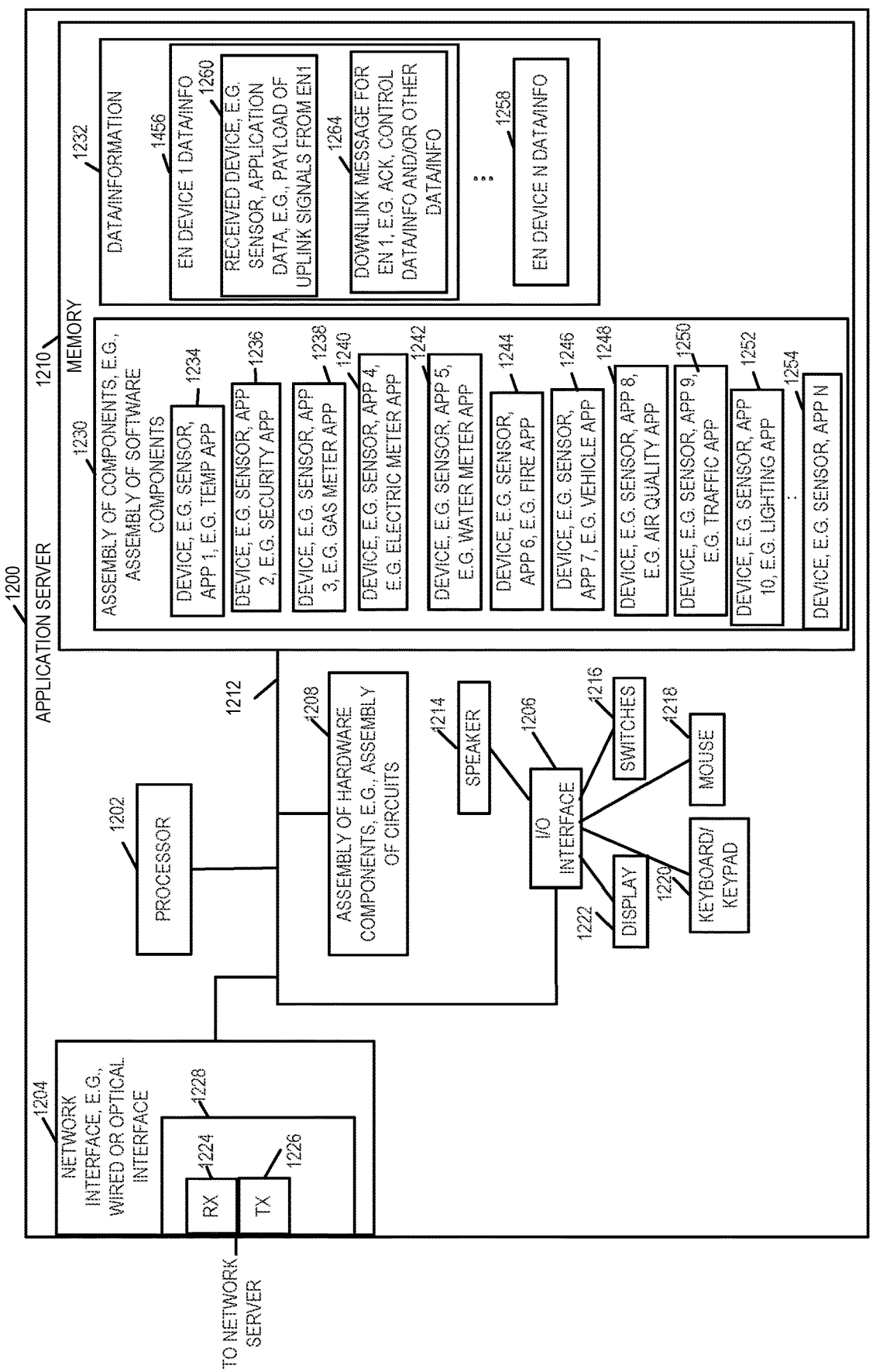
FIG. 9 is a drawing of an exemplary application server (AS) implemented in accordance with an exemplary embodiment.

FIG. 9 is a drawing of an exemplary application server (AS) 1200 implemented in accordance with an exemplary embodiment. Exemplary control server 1200 is, e.g. one of the application servers 236, 238, 240 of FIGS. 2 and/or 3. Exemplary application server 1200 includes a processor 1202, e.g., a CPU, a network interface 1204, e.g., a wired or optical interface, an I/O interface 1206, an assembly of hardware components 1208, e.g., an assembly of circuits, and memory 1210 coupled together via a bus 1212 over which the various elements may interchange data and information. Network interface 1204 includes a receiver 1224 and a transmitter 1226. In some embodiments, receiver 1224 and transmitter 1226 are included as part of a transceiver 1228. Network interface 1204 couples the control server, e.g. an application server, to a network server, e.g., network server 1 218.

Application server 1200 further includes a plurality of input/output devices (speaker 1214, switches 1216, mouse 1218, keyboard/keypad 1220 and display 1222, which are coupled to I/O interface 1206 allowing the various I/O devices to communicate with other elements coupled to bus 1212.

Memory 1210 includes an assembly of components 1230, e.g., an assembly of software components, and data/information 1232. Assembly of components 1230 includes a plurality of device, e.g. sensor, applications, e.g., corresponding to different functions and/or services (device, e.g., sensor, app 1 1234, e.g., a temperature app, device, e.g., sensor, app 2 1236, e.g., a security app, device, e.g., sensor, app 3 1238, e.g., a gas meter app, device, e.g., sensor, app 4 1240, e.g., an eclectic meter app, device, e.g., sensor, app 5 1242, e.g., a water meter app, device, e.g., sensor, app 6 1244, e.g., a fire detection and/or notification app, device, e.g., sensor, app 7 1246, e.g., a vehicle app such as a vehicle tracking app or vehicle status reporting app, device, e.g., sensor, app 8 1248, e.g., an air quality app, device, e.g., sensor, app 9 1250, e.g., a traffic application for monitoring and/or controlling a traffic device such as traffic light, device, e.g., sensor, app 10 1252, e.g., a lighting app, . . . , a device, e.g., sensor, app N 1254). Data information 1232 includes information corresponding to a plurality of end node (EN) devices (EN device 1, e.g. EN IoT device 1, data information 1260, . . . , EN device N data/information 1258). EN device 1 data/information 1256 includes received device, e.g., sensor, application data 1260, e.g., payload of uplink signals from EN 1 which have been successfully received by a gateway and forwarded via a network server to the application server, and a downlink message 1264 intended for EN, e.g., an ACK, control data/information and/or other data/information to be sent to EN1 via a network server and a network server selected GW.

Figure 10A:
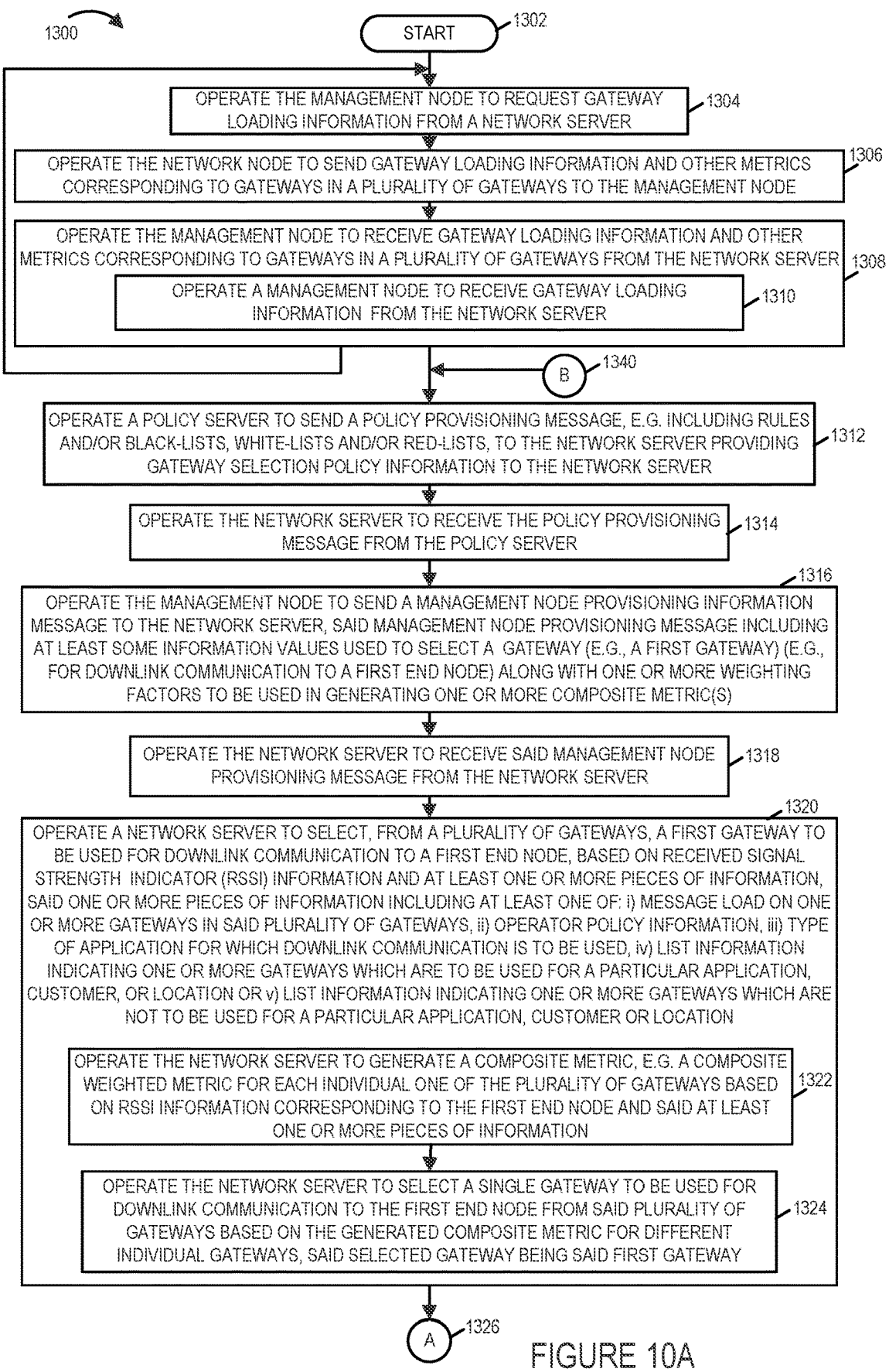
FIG. 10A is a first part of an exemplary method of operating a communications system in accordance with an exemplary embodiment.

FIG. 10, comprising the combination of FIG. 10A and FIG. 10B, is a flowchart 1300, of an exemplary method of operating a communications system, e.g., communications system 200 of FIG. 2, in accordance with an exemplary embodiment. Operation starts in step 1302 in which the communications system is powered on and initialized. Operation proceeds from step 1302 to step 1304. In step 1304 a management node, e.g., organization and management (O&M) system server node 232, sends a request to a network server, e.g., network server 218, requesting gateway loading information from the network server. Operation proceeds from step 1304 to step 1306. In step 1306 the network server sends gateway loading information and other metrics, e.g., number of end devices connected, number of end devices transmitting during a time interval, RSSI information, SNR information, SINR information, delay time information, recovery success/failure information, etc. corresponding to a plurality of gateways to the management node. Operation proceeds from step 1306 to step 1308.

In step 1308 the management node receives gateway loading information and other metrics corresponding to gateways in a plurality of gateways (e.g., GW 1 210, GW 2 212, . . . , GW M 214) from the network server. Step 1308 includes step 1310 in which the management node receives gateway loading information from the network server. Steps 1304, 1306 and 1308 are performed on an ongoing basis, e.g. repetitively. Operation proceeds from step 1308 to step 1312.

In step 1312 a policy server, e.g. operator policy server 234, sends a policy provisioning message, e.g., including rules and/or black-lists, white-lists and/or red-lists, to the network server providing gateway selection policy information to the network server. In some embodiments, the policy provisioning message includes black list information indicating applications and/or end node devices which are not to use particular gateways. In some embodiments, the policy provisioning message includes black list information indicating locations from which end node devices are to be blocked from using particular gateways. In some embodiments, the policy provisioning message includes white list information indicating applications and/or end node devices which are allowed to use particular gateways. In some embodiments, the policy provisioning message includes white list information indicating locations from which end node devices are allowed to use particular gateways. In some embodiments, the policy provisioning message includes red-list information indicating applications and/or end node devices which are to used particular gateways under certain specified sets of conditions (e.g., access allowed under certain conditions which can be a combination of time, space (location) gateway load, SNR and/or RSSI). Operation proceeds from step 1312 to step 1314. In step 1314 the network server receives the policy provisioning message from the policy server and recovers the communicated information. Operation proceeds from step 1314 to step 1316.

In step 1316 the management node sends a management provisioning message to the network server, said management provisioning message including ate least some information values used to select a gateway (e.g., a first gateway) (e.g., for downlink communication with the first end node) with one or more weighting factors to be used in generating one or more composite metrics. In some embodiments, the management node provisioning message includes: i) gateway loading information for different gateways in said plurality or gateways and/or ii) gateway load based weighting factors corresponding to different gateways. Operation proceeds from step 1316 to step 1318. In step 1318 the network server receives the management node provisioning message from the network server and recovers the communicated information. Operation proceeds from step 1318 to step 1320.

In step 1320 the network server selects, from a plurality of gateways, a first gateway to be used for downlink communication to a first end node, based on received signal strength indicator (RSSI) information and at least one or more pieces of information, said one or more pieces of information including at least one of: i) message load on one or more gateways in said plurality of gateways, ii) operator policy information, iii) type of application for which downlink communication is to be used, iv) list information (e.g., a white-list—gateways to be used for application, customer or city) indicating one or more gateways which are to be used for a particular application, customer, or location, or v) list information indicating one or more gateways (e.g., a black-list—gateways not to be used for an application customer or city) which are not to be used for a particular application, customer or location.

In some embodiments, the plurality of gateways are a set of gateways which have successfully recovered the same uplink packet transmitted by the first end node via broadcast signals.

In some embodiments, step 1320 includes steps 1322 and 1324. In step 1322 the network server generates a composite metric, e.g. a composite weighted metric (CWM), for each individual one of the plurality of gateways based on RSSI information corresponding to the first end node device and said at least one or more pieces of information. In some embodiments, the generated composite metric is a composite (e.g., a sum) of weighted metric values including a weighted RSSI value and at least one other weighted information value. Operation proceeds from step 1322 to step 1324. In step 1324, the network server selects a single gateway to be used for downlink communication to the first end node from said plurality of gateways based on the generated composite metric for different individual gateways, said selected gateway being the first gateway. In some embodiments, the selected first gateway is different from a gateway which would be selected solely based on RSSI values when at least one other weighted information values is the determining factor between a selection between different ones of said plurality of gateways (e.g., because of the same or similar RSSI results or because a gateway is white or black (not allowed gateway for the end user, application or current end user device location) listed potentially overruling what would be a straight forward RSSI selection). Operation proceeds from step 1320, via connecting node A 1326, to step 1328.

In step 1328 the network server stores information identifying the selected single gateway (first gateway) to be used fro downlink communicate to the first end node. Operation proceeds from step 1328 to step 1330. In step 1330 the network server determines to use the identified selected single gateway for downlink communication to the first end node for a predetermined amount of time or until a trigger event occurs. Exemplary trigger events include: the uplink transmission from the first end node has started to be successfully recovered by a different set of GWs, the first EN has moved, e.g., more than a predetermined amount or into a different region, RSSI and/or SNR with regard to first end node of uplink signals have changed, e.g., more than predetermined threshold(s), GW loading has changed more than a threshold amount, backhaul loading has change more than a predetermined amount, a special time interval is about to begin in which traffic conditions are expected to change, etc.

Operation proceeds from step 1330 to step 1332. In step 1332 the network server receives a downlink message for the first end node, e.g., from an application server, e.g., application server 236. Operation proceeds from step 1332 to step 1334. In step 1334 the network server uses the identified single gateway (the first gateway) for downlink communication to the first end node. Step 1334 includes step 1336 in which the network server sends a message to the first gateway, said message including a payload to be transmitted via downlink signals to the first end node. In some embodiments, the payload to be transmitted via downlink signals to the first end node includes one of control information of an acknowledgment from an application server, said acknowledgment acknowledging a data report sent from the first end node to the application server. Operation proceeds from step 1334 to step 1338.

In step 1338 the network server determines is the predetermined amount of time has expired or if a trigger event has occurred. If the network server determines that the predetermined amount of time has not expired and a trigger event has not occurred, then the network server will not (at this time) re-evaluate (and re-determine) which single GW is to be used for downlink to the first end node, and operation proceeds from step 1338 to step 1332. However, If the network server determines that the predetermined amount of time has expired or a trigger event has occurred, then the network server will (at this time) re-evaluate (and re-determine) which single GW is to be used for downlink to the first end node, and operation proceeds from step 1338, via connecting node B 1340, to step 1312.

Figure 11:
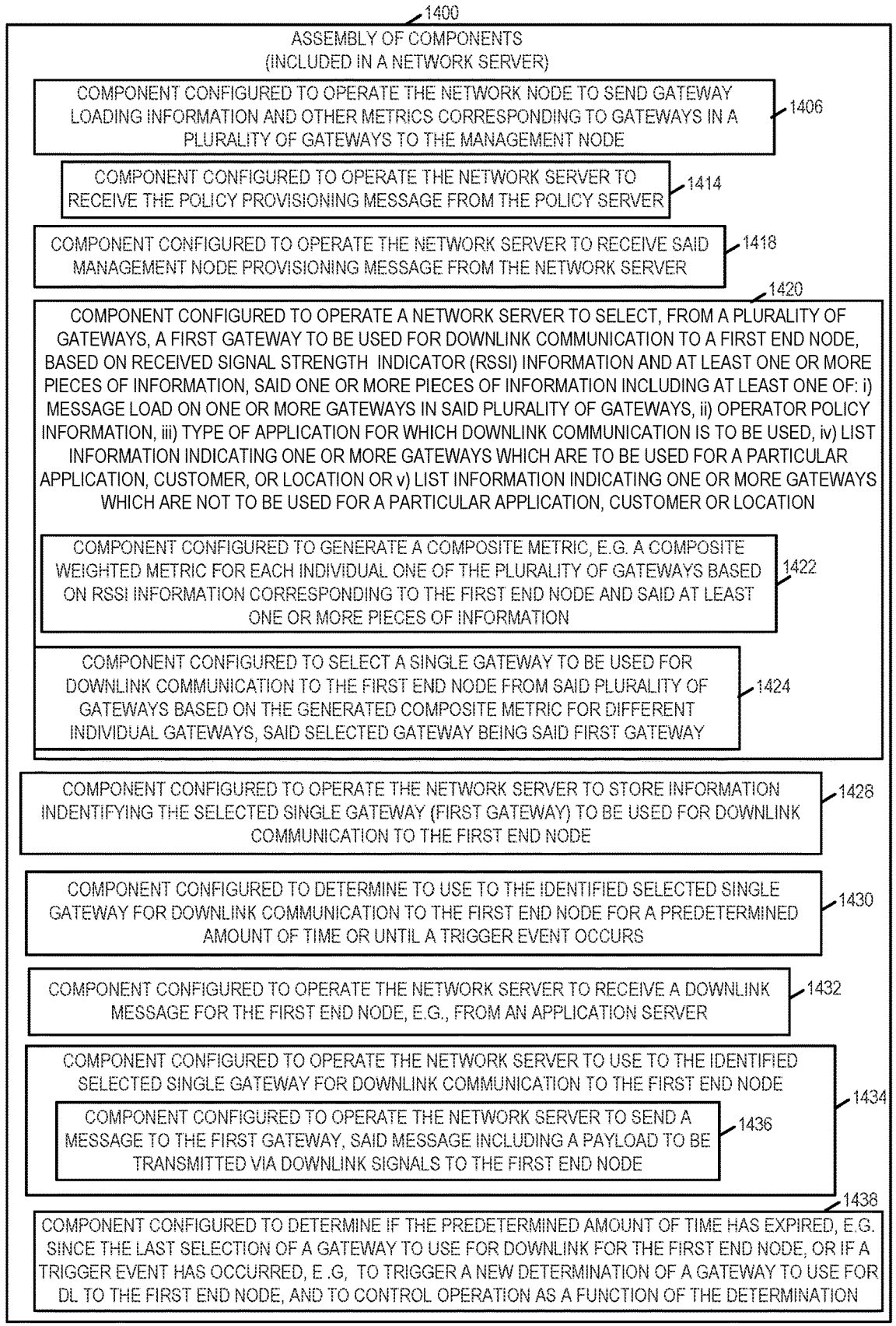
FIG. 11 is a drawing of an exemplary assembly of components included in a network server implemented in accordance with an exemplary embodiment.

FIG. 11 is a drawing of an exemplary assembly of components 1400 included in a network server, e.g., network server 218 of FIGS. 2 and 3 and/or network server 700 of FIG. 4, implemented in accordance with an exemplary embodiment. The components in the assembly of components 1400 can, and in some embodiments are, implemented fully in hardware within a processor, e.g., processor 702, e.g., as individual circuits. The components in the assembly of components 1400 can, and in some embodiments are, implemented fully in hardware within the assembly of hardware components 710, e.g., as individual circuits corresponding to the different components. In other embodiments some of the components are implemented, e.g., as circuits, within processor 702 with other components being implemented, e.g., as circuits within assembly of components 710, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the network server 700, with the components controlling operation of network server 700 to implement the functions corresponding to the components when the components are executed by a processor e.g., processor 702. In some such embodiments, the assembly of components 1400 is included in the memory 712 as part of assembly of software components 736. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 1400 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the network server 1400 or elements therein such as the processor 702, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method.

Assembly of components 1400 includes a components 1406 configured to operate the network node to send gateway loading information and other metrics corresponding to gateways in a plurality of gateways to the management node, a component 1414 configured to operate the network node to receive policy provisioning messages from the policy server, and a component 1418 configured to operate the network server to receive management node provisioning messages from the network server. Assembly of components 1400 further includes a component 1420 configured to operate the network server to select, from a plurality of gateways, a first gateway to be used for downlink communication to a first end node, based on received signal strength indicator (RSSI) information and at least one or more pieces of information, said one or more pieces of information including at least one of: i) message load on one or more gateways in said plurality of gateways, ii) operator policy information, iii) type of application for which downlink communication is to be used, iv) list information indicating one or more gateways which are to be used for a particular application, customer or location, or v) list information indicating one or more gateways which are not to be used for a particular application, customer, or location. Component 1420 includes a component 1422 configured to generate a composite metric, e.g., a composite weighted metric (CWM) for each individual one of the plurality of gateways based on RSSI information corresponding to the first end node and said at least one or more pieces of information, and a component 1424 configured to select a single gateway to be used for downlink communication to the first end node from said plurality of gateways based on the generated composite metric for different individual gateways, said selected gateway being the first gateway, e.g. the gateways with the highest CWM.

Assembly of components 1400 further includes a component 1428 configured to operate the network server to store information identifying the selected single gateway (e.g., currently designated first gateway) to be used for downlink communication to the first end node, a component 1430 configured to determine to use the identified selected single gateway for downlink communication to the first end node for a predetermined amount of time or until a trigger event occurs, and a component 1432 configured to operate the network server to receive a downlink message for the first end node, e.g., from an application server, a component 1434 configured to operate the network server to use the identified selected single gateway for downlink communication to the first end node. Component 1434 includes a component 1436 configured to operate the network server to send a message to the first gateway, said message including a payload to be transmitted via downlink signals to the first end node. Assembly of components 1400 further includes a component 1438 configured to determine if the predetermined amount of time has expired, e.g., since the last selection of a gateway to use for downlink for the first end node, or if a trigger event has occurred, e.g., to trigger a new determination of a gateway to use for downlink (DL) to the first end node, and to control operation as a function of the determination.

Figure 12:
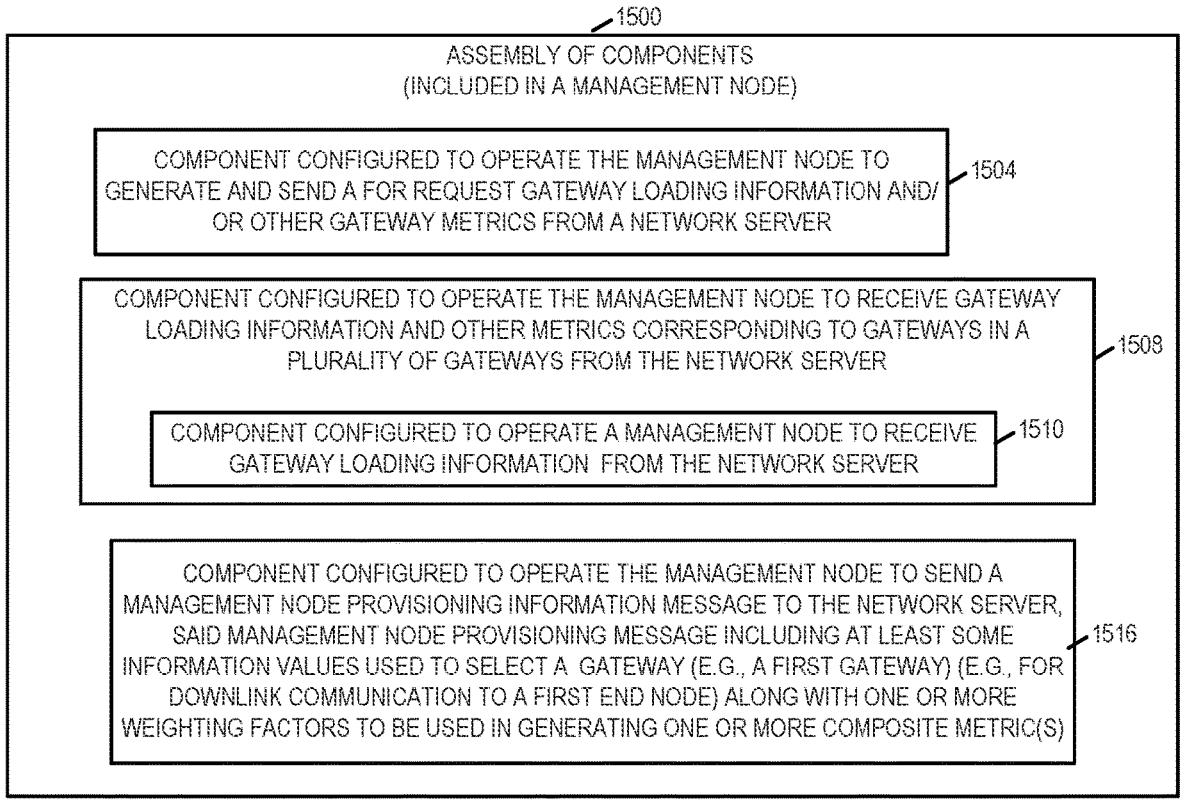
FIG. 12 is a drawing of an exemplary assembly of components including in a management node in accordance with an exemplary embodiment.

FIG. 12 is a drawing of an exemplary assembly 1500 of components including in a management node, e.g., O&M system server node 232 of FIGS. 2 and 3 and/or O&M management system node 800 of FIG. 5, in accordance with an exemplary embodiment.

The components in the assembly of components 1500 can, and in some embodiments are, implemented fully in hardware within a processor, e.g., processor 802, e.g., as individual circuits. The components in the assembly of components 1500 can, and in some embodiments are, implemented fully in hardware within the assembly of hardware components 808, e.g., as individual circuits corresponding to the different components. In other embodiments some of the components are implemented, e.g., as circuits, within processor 802 with other components being implemented, e.g., as circuits within assembly of components 808, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 810 of the management node 800, with the components controlling operation of management node 800 to implement the functions corresponding to the components when the components are executed by a processor e.g., processor 802. In some such embodiments, the assembly of components 1500 is included in the memory 810 as part of assembly of software components 828. In still other embodiments, various components in assembly of components 1500 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1500 is stored in the memory 810, the memory 810 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the management node 800 or elements therein such as the processor 802, to perform the functions of corresponding steps illustrated and/or described in the method of one or more of the flowcharts, signaling diagrams and/or described with respect to any of the Figures. Thus the assembly of components 1500 includes various components that perform functions of corresponding one or more described and/or illustrated steps of an exemplary method.

Assembly of components 1500 includes a component 1504 configured to operate the management node to generate and send a request for gateway loading information and/or other gateway metrics from a network server, said request being sent to the network server, and a component 1508 configured to operate the management node to receive a gateway loading information and/or other metrics corresponding to gateways in a plurality of gateways from the network server. Component 1508 includes a component 1510 configured to operate the management node to receive gateway loading information from the network server. Assembly of components 1500 further includes a component 1516 configured to operate the management node to send a management node provisioning information message to the network serve, said management node provisioning message including at lease some information values used to select a gateway (e.g. a first gateway) (e.g., for downlink communication to a first end node) along with one or more weighting factors to be used in generating one or more composite metrics.

Figure 13:
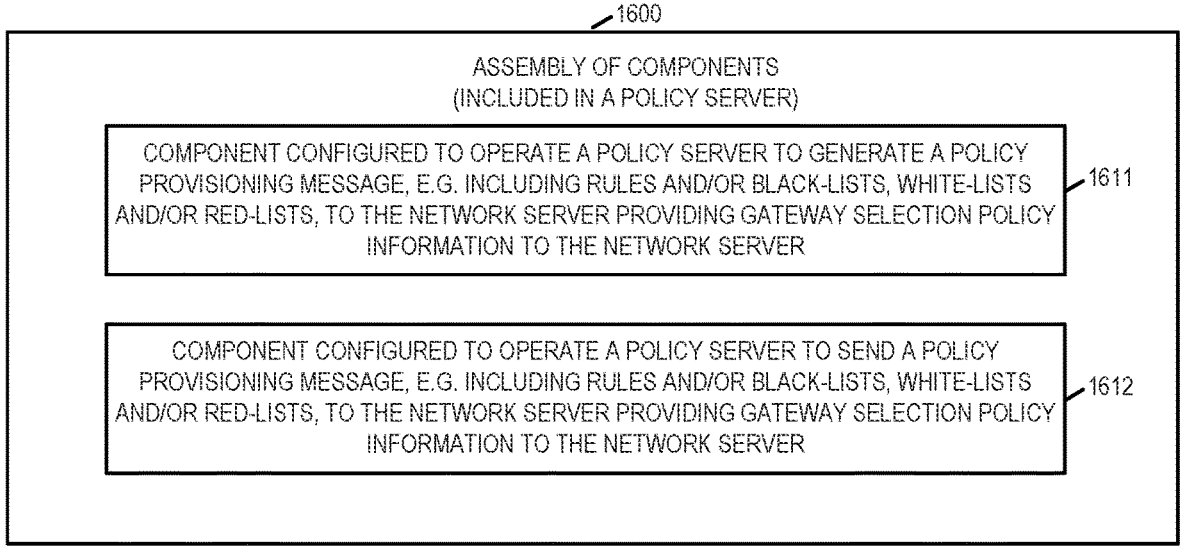
FIG. 13 is a drawing of an exemplary assembly of components included in a policy server in accordance with an exemplary embodiment.

FIG. 13 is a drawing of an exemplary assembly of components 1600 included in a policy server, e.g., operator policy server 234 of FIGS. 2 and 3, and/or operator policy server 900 of FIG. 6, in accordance with an exemplary embodiment.

The components in the assembly of components 1600 can, and in some embodiments are, implemented fully in hardware within a processor, e.g., processor 902, e.g., as individual circuits. The components in the assembly of components 1600 can, and in some embodiments are, implemented fully in hardware within the assembly of hardware components 908, e.g., as individual circuits corresponding to the different components. In other embodiments some of the components are implemented, e.g., as circuits, within processor 902 with other components being implemented, e.g., as circuits within assembly of components 908, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 910 of the policy server 900, with the components controlling operation of policy server 900 to implement the functions corresponding to the components when the components are executed by a processor e.g., processor 1402. In some such embodiments, the assembly of components 1600 is included in the memory 910 as part of assembly of software components 928. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1600 is stored in the memory 910, the memory 910 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the policy server 900 or elements therein such as the processor 902, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method.

Assembly of components 1600 includes a component 1611 configured to operate a policy server to generate a policy provisioning message, e.g., including rules and/or black-lists, white-lists and/or red-lists, to the network server providing gateway selection policy information to the network server, and a component 1612 configured to operate a policy server to send a policy provisioning message, e.g., including rules and/or black-lists, white-lists and/or red-lists, to the network server providing gateway selection policy information to the network server, Various aspects and/or features of the some embodiments of the current invention are further discussed below.

In various embodiments, in accordance with the present invention, gateway selection for sending downlink (DL) messages by the network server (NS) in an access network, e.g. an LoRa access network or another access network, e.g., another wireless network, e.g., another IoT wireless network, is based on the combination of two or more or all of the following factors: i) RSSI values in the uplink messages from the device, ii) the messaging load of individual gateways, iii) the operator priorities, iv) application type, e.g., prioritize among different applications, e.g. based on quality of service, and v) white-list and/or black-list associations between gateways and devices, e.g., to facilitate an operator designating certain gateways for a given application/customer/city.

If a given device (e.g., an EN device such as an IoT sensor or application device), is reachable through multiple gateways, the exemplary methods and apparatus in accordance with the present invention can be put to optimal use. The use of the above mentioned additional factors, in addition to RSSI, in the selection of a GW increases the likelihood of ensuring QoS and load balancing in the system.

In some embodiments, when a network server (NS) needs to send a message to a given device (e.g., EN 1), the network server computes a composite metric based on different weightages assigned to above described factors for each of the potential gateways. In some such embodiments, the network server selects a gateway which meets a criteria, e.g., an optimal criteria, or has a highest composite metric value from among the alternative candidate gateways that may be used for the downlink. In some embodiments, the selected gateway, e.g., the optimal gateway, is refreshed periodically by the network server per operator policy and/or preference. Thus, in some embodiments, the selection of a particular gateway to use for downlink for an end node is performed and then the selected gateway is used for downlink for the EN for a given time interval. In some embodiments, the composite metric computation specifies weightages and/or thresholds for different contributing factors mentioned above.

The following factors can be, and sometimes are, used to compute the weighted metric for selection of a GW to use for downlink with respect to a particular EN device:

i) RSSI values of the uplink messages from the device;
ii) Signal to Noise Ratio (SNR) and/or Signal to Interference Plus Noise Ratio (SINR);
iii) The messaging load of individual gateways;
iv) The operator policies;
v) Application type, prioritize among different applications;
vi) Multiple associations between gateways and devices (white-list, black list, red-list, etc.) to facilitate an operator designating certain gateways for a given application/customer/city or other entity, and also to provide an ability to an operator for representing different levels of device priority and policy; and
vii) Assign a set of devices (types of devices) to a given (set of) gateway(s).

Methods and apparatus, in accordance with the present invention may, and sometimes do include use of one or more or all of the above factors, but the factors used in generating the composite weighted metrics are not limited to the above mentioned factors.

In accordance with a feature of some embodiments, through the network server (NS), the O&M system: i) retrieves GW load; ii) pushes policies, iii) communicates while/black listed devices for a gateway to the network server. In some embodiments, the network server (NS) computes a Composited Weighted Metric (CWM) for each of the GWs for a given device (e.g., EN1), and then chooses, based on the computed CWMs, a GW, e.g., with optimal CWM value, for DL transmit to the device subject to policy compliance. Then, the network server uses the chosen GW for sending DL messages, e.g., downlink messages from an application server, to device (e.g., EN 1). In some embodiments, the NS refreshes the CWM at regular intervals per operator policy.

In one exemplary embodiment, Composite Weighted Metric (CWM)=$\Sigma_{i=1}^{i=n}$Fi×Wi where Fi=Factor i value, and Wi=Weightage of factor i.

Various features and/or advantages of some embodiments of the present invention are described below. Various novel embodiments, in accordance with the present invention, enhance network capacity over existing approaches and/or offer differentiated services. Various novel embodiments, in accordance with the present invention, prevent and/or reduce loss messages due to gateway over loading, and are especially useful in a high-latency access network. Existing deployed access network, e.g., by being upgraded to include features of the current invention, can take advantage of the enhancements. Various novel embodiments, in accordance with the present invention, can enhance capability and scalability of an existing access network, e.g., by implementing features of the current invention within software updates, with no new hardware addition. In some embodiments, when upgrading a system to include features of the present invention, no specification changes are required with regard to the MAC and air interface, e.g., implementing an embodiment in accordance with the present invention in a system using LoRa, does not require an LoRa specification changes on the MAC and air interface. In various embodiments, O&M system is enhanced to exchange load information. In some implementation of the present invention there are no changes needs in the end node and gateway devices, e.g. the LoRa end node and gateway devices.

Some exemplary embodiments, in accordance with the present invention, enable a service provider to offer differentiated services in a IoT network, e.g., a LoRa IoT network or another type of IoT network, where it might not have been otherwise possible to offer the differentiated services. Some exemplary embodiments, in accordance with the present invention, enable a service provider to prioritize different applications and customers. Some exemplary embodiments, in accordance with the present invention, e.g., in which a network is upgraded to include features of the present invention, enhance capacity utilization of deployed gateways, e.g. deployed LoRa gateways or other types of deployed IoT type GWs, e.g., in a WAN. Some exemplary embodiments, in accordance with the present invention, e.g., in which a network is upgraded to include features of the present invention, reduce capital expenditures (CAPEX) and operating expenses (OPEX) by enhancing capacity. Some exemplary embodiments, in accordance with the present invention, e.g., in which a network is upgraded to include features of the present invention, require no changes to the end node (EN) devices.

Methods and apparatus in accordance with the present invention are well suited for various wide area wireless networks in which there are a large number of users, e.g., IoT devices which broadcast uplink signals which are typically detected and forwarded by a plurality of gateways to a network server.

Numbered List of Exemplary Method Embodiments

Method Embodiment 1 A communications method, comprising: operating a network server to select (534 or 1320), from a plurality of gateways, a first gateway to be used for downlink communication to a first end node, based on received signal strength indicator (RSSI) information and at least one or more pieces of information, said one or more pieces of information including at least one of: i) message load on one or more gateways in said plurality of gateways, ii) operator policy information, iii) type of application for which downlink communication is to be used; iv) list information (white list—gateways to be used for application, customer or city) indicating one or more gateways which are to be used for a particular application, customer or location or v) list information indicating one or more gateways which are not (black list—gateways not to be used for an application, customer or city) to be used for a particular application, customer or location; and operating the network server to send (558 or 1336) a message (560) to the first gateway, said message including a payload to be transmitted via downlink signals to the first end node.

Method Embodiment 2 The method of Method Embodiment 1, further comprising: prior, to operating the network server to send (558 or 1336) the message (560) to the first gateway, operating the network server to receive (556 or 1332) a downlink message (554) for the first end node from an application server.

Method Embodiment 3 The method of Method Embodiment 1, wherein said plurality of gateways are a set of gateways which have successfully recovered the same uplink packet transmitted by the first end node via broadcast signals.

Method Embodiment 4 The method of Method Embodiment 1, wherein said payload to be transmitted via downlink signals to the first end node includes one of control information or an acknowledgment from an application server, said acknowledgment acknowledging a data report sent from the first end node to the application server.

Method Embodiment 5 The method of Method Embodiment 1, wherein operating the network server to select (534 or 1320) a first gateway includes: generating (536 or 1322) a composite metric for each individual one of the plurality of gateways based on RSSI information corresponding to the first end node and said at least one or more pieces of information; and selecting (544 or 1324) a single gateway to be used for downlink communication to the first end node from said plurality of gateways based on the generated composite metric for different individual gateways, said selected single gateway being said first gateway.

Method Embodiment 6 The method of Method Embodiment 5, further comprising: storing (1328) information identifying selected single gateway to be used for downlink communication to the first end node; and using (1330/1334) the identified selected single gateway for downlink communication to the first node for a predetermined amount of time.

Method Embodiment 7 The method of Method Embodiment 5, wherein said generated composite metric is a composite (e.g., sum) of weighted metric values including a weighted RSSI value and at least one other weighted information value.

Method Embodiment 8 The method of Method Embodiment 5, wherein the selected first gateway is different from a gateway which would be selected solely based on RSSI values when said at least one other weighted information value is the determining factor between a selection between different ones of said plurality of gateways (e.g., because of the same or similar RSSI results or because a gateway is white or black (not allowed gateway for the end user, application or current end user device location) listed potentially overruling what would be a straight forward RSSI selection process).

Method Embodiment 9 The method of Method Embodiment 5, further comprising: operating a management node (232) to receive (514 or 1308) gateway loading information from the network server; and operating the management node (232) to send (526 or 1316) a management node provisioning information message (528) to the network server (218) with at least some information values used to select said first gateway along with one or more weighting factors to be used in generating said composite metric.

Method Embodiment 10 The method of Method Embodiment 9, wherein said management node provisioning message (528) includes: i) gateway loading information for different gateways in said plurality of gateways and/or ii) gateway load based weighting factors corresponding to different gateways.

Method Embodiment 11 The method of Method Embodiment 10, further comprising, prior to said management node sending (526) said management node provisioning message (528): operating the management system node (232) to request (468 or 1304) gateway loading information from the network server; and operating the management system node (232) to receive (514 or 1306) gateway loading information (and other metrics such as number of end devices connected, number of end devices transmitting during a time interval, RSSI information, SNR information, SINR information, delay time information, recovery success/failure information, etc.) corresponding to gateways in said plurality of gateways from said network server (218).

Method Embodiment 12 The method of Method Embodiment 9, further comprising: prior to selecting (544 or 1324) the first gateway to be used for downlink communications to the first end node: operating a policy server (234) to send (520 or 1312) a policy provisioning message (522) to the network server (218) providing gateway selection policy information to the network server.

Method Embodiment 13 The method of Method Embodiment 12, wherein said policy provisioning message (522) includes blacklist information indicating applications and/or end node devices which are not to use particular gateways.

Method Embodiment 14 The method of Method Embodiment 12, wherein said policy provisioning message (522) includes blacklist information indicating locations from which end node devices are to be blocked from using particular gateways.

Method Embodiment 15 The method of Method Embodiment 12, wherein said policy provisioning message (522) includes white list information indicating applications and/or end node devices which are allowed to use particular gateways.

Method Embodiment 16 The method of Method Embodiment 12, wherein said policy provisioning message (522) includes white list information indicating locations from which end node devices are allowed to use particular gateways.

Method Embodiment 17 The method of Method Embodiment 12, wherein said policy provisioning message (522) includes red list information indicating applications and/or end node devices which are to use particular gateways under certain specified sets of conditions (e.g., access allowed under certain conditions which can be a combination of time, space (location), gateway load, SNR, and/or RSSI).

Numbered List of Exemplary System Embodiments

System Embodiment 1 A communications system (200), comprising: a network server (218 or 700) including: a first processor (702) configured to: operate a network server (218 or 700) to select (534 or 1320), from a plurality of gateways (210, 212, . . . 214), a first gateway to be used for downlink communication to a first end node (202 or 204 or 206 or 208), based on received signal strength indicator (RSSI) information and at least one or more pieces of information, said one or more pieces of information including at least one of: i) message load on one or more gateways in said plurality of gateways, ii) operator policy information, iii) type of application for which downlink communication is to be used; iv) list information (white list—gateways to be used for application, customer or city) indicating one or more gateways which are to be used for a particular application, customer or location or v) list information indicating one or more gateways which are not (black list—gateways not to be used for an application, customer or city) to be used for a particular application, customer or location; and operate the network server (218 or 700) to send (558 or 1336) a message (560) to the first gateway, said message including a payload to be transmitted via downlink signals to the first end node.

System Embodiment 2 The communications system (200) of System Embodiment 1, further comprising: wherein said first processor (702) is further configured to: prior, to operating the network server to send (558 or 1336) the message (560) to the first gateway, operate the network server to receive (556 or 1332) a downlink message (554) for the first end node from an application server (236 or 238 or 240).

System Embodiment 3 The communications system (200) of System Embodiment 1, wherein said plurality of gateways are a set of gateways which have successfully recovered the same uplink packet transmitted by the first end node via broadcast signals.

System Embodiment 4 The communications system (200) of System Embodiment 1, wherein said payload to be transmitted via downlink signals to the first end node includes one of control information or an acknowledgment from an application server, said acknowledgment acknowledging a data report sent from the first end node to the application server (236 or 238 or 240).

System Embodiment 5 The communications system (200) of System Embodiment 1, wherein said first processor (702) is configured to: generate (536 or 1322) a composite metric for each individual one of the plurality of gateways based on RSSI information corresponding to the first end node and said at least one or more pieces of information; and select (544 or 1324) a single gateway to be used for downlink communication to the first end node from said plurality of gateways based on the generated composite metric for different individual gateways, said selected single gateway being said first gateway, as part of being configured to operate the network server to select (534 or 1320) a first gateway.

System Embodiment 6 The communications system (200) of System Embodiment 5, wherein said first processor (702) is further configured to: operate the network server (218 or 700) to store (1328) information identifying selected single gateway to be used for downlink communication to the first end node; and operate the network server (218 or 700) to use (1330/1334) the identified selected single gateway for downlink communication to the first node for a predetermined amount of time.

System Embodiment 7 The communications system (200) of System Embodiment 5, wherein said generated composite metric is a composite (e.g., sum) of weighted metric values including a weighted RSSI value and at least one other weighted information value.

System Embodiment 8 The communications system (200) of claim 5, wherein the selected first gateway is different from a gateway which would be selected solely based on RSSI values when said at least one other weighted information value is the determining factor between a selection between different ones of said plurality of gateways (e.g., because of the same or similar RSSI results or because a gateway is white or black (not allowed gateway for the end user, application or current end user device location) listed potentially overruling what would be a straight forward RSSI selection process).

System Embodiment 9 The communications system (200) of System Embodiment 5, further comprising: a management node (232 or 800) including a second processor (802), wherein said second processor (802) is configured to: operate the management node (232 or 800) to receive (514 or 1308) gateway loading information from the network server; and operate the management node (232 or 800) to send (526 or 1316) a management node provisioning information message (528) to the network server (218) with at least some information values used to select said first gateway along with one or more weighting factors to be used in generating said composite metric.

System Embodiment 10 The communications system (200) of System Embodiment 9, wherein said management node provisioning message (528) includes: i) gateway loading information for different gateways in said plurality of gateways and/or ii) gateway load based weighting factors corresponding to different gateways.

System Embodiment 11 The communications system (200) of System Embodiment 10, wherein said second processor (802) is further configured to: operate the management system node (232 or 800) to request (468 or 1304) gateway loading information from the network server; and operate the management system node (232 or 800) to receive (514 or 1306) gateway loading information (and other metrics such as number of end devices connected, number of end devices transmitting during a time interval, RSSI information, SNR information, SINR information, delay time information, recovery success/failure information, etc.) corresponding to gateways in said plurality of gateways from said network server (218).

System Embodiment 12 The communications system (200) of System Embodiment 9, further comprising a policy server (234 or 900) including a third processor (902), and wherein said third processor (902) is configured to: operate the policy server (234 or 900) to send (520 or 1312) a policy provisioning message (522) to the network server (218 or 700) providing gateway selection policy information to the network server, prior to the network server selecting (544 or 1324) the first gateway to be used for downlink communications to the first end node.

System Embodiment 13 The communications system (200) of System Embodiment 12, wherein said policy provisioning message (522) includes blacklist information indicating applications and/or end node devices which are not to use particular gateways.

System Embodiment 14 The communications system (200) of System Embodiment 12, wherein said policy provisioning message (522) includes blacklist information indicating locations from which end node devices are to be blocked from using particular gateways.

System Embodiment 15 The communications system (200) of System Embodiment 12, wherein said policy provisioning message (522) includes white list information indicating applications and/or end node devices which are allowed to use particular gateways.

System Embodiment 16 The communications system (200) of System Embodiment 12, wherein said policy provisioning message (522) includes white list information indicating locations from which end node devices are allowed to use particular gateways.

System Embodiment 17 The communications system (200) of System Embodiment 12, wherein said policy provisioning message (522) includes red list information indicating applications and/or end node devices which are to use particular gateways under certain specified sets of conditions (e.g., access allowed under certain conditions which can be a combination of time, space (location), gateway load, SNR, and/or RSSI).

Numbered List of Exemplary Non-Transitory

Computer Readable Medium Embodiments

Non-Transitory Computer Readable Medium Embodiment 1. A non-transitory computer readable medium (712)

including computer executable instructions which when executed by a processor (702) of a network server (218 or 700) cause the network server to perform the steps of: operating the network server to select (534 or 1320), from a plurality of gateways, a first gateway to be used for downlink communication to a first end node, based on received signal strength indicator (RSSI) information and at least one or more pieces of information, said one or more pieces of information including at least one of: i) message load on one or more gateways in said plurality of gateways, ii) operator policy information, iii) type of application for which downlink communication is to be used; iv) list information (white list—gateways to be used for application, customer or city) indicating one or more gateways which are to be used for a particular application, customer or location or v) list information indicating one or more gateways which are not (black list—gateways not to be used for an application, customer or city) to be used for a particular application, customer or location; and operating the network server to send (558 or 1336) a message (560) to the first gateway, said message including a payload to be transmitted via downlink signals to the first end node.

Non-Transitory Computer Readable Medium Embodiment 2 A non-transitory computer readable medium (810) including computer executable instructions which when executed by a processor (802) of a management node (232 or 800) cause the management node (232 or 800) to perform the steps of: operating the management node (232 or 800) to receive (514 or 1308) gateway loading information from the network server; and operating the management node (232) to send (526 or 1316) a management node provisioning information message (528) to the network server (218) with at least some information values used to select said first gateway along with one or more weighting factors to be used in generating said composite metric.

Non-Transitory Computer Readable Medium Embodiment 3 A non-transitory computer readable medium (910) including computer executable instructions which when executed by a processor (902) of a policy server (234 or 900) cause the policy server (234 or 900) to perform the steps of: operating the policy server (234) to send (520 or 1312) a policy provisioning message (522) to the network server (218) providing gateway selection policy information to the network server.

Various embodiments are directed to apparatus, e.g., control servers such as application servers (ASs), network server, O&M system nodes, operator policy servers, gateways such as IoT gateways, End Node (EN) devices such as EN IoT devices, e.g. EN IoT sensor or application devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, an AMF device, servers, customer premises equipment devices, cable systems, non-cellular networks, cellular networks, service management systems, network nodes, gateways, cable headend/hubsites, network monitoring node/ servers, cluster controllers, cloud nodes, production nodes, cloud services servers and/or network equipment devices. Various embodiments are also directed to methods, e.g., method of controlling and/or operating control servers such as application servers (ASs), network server, O&M system nodes, operator policy servers, gateways such as IoT gateways, End Node (EN) devices such as EN IoT devices, e.g. EN IoT sensor or application devices user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, user devices, base stations, gateways, servers, cable networks, cloud networks, nodes, servers, cloud service servers, customer premises equipment devices, controllers, network monitoring nodes/ servers and/or cable or network equipment devices. Various embodiments are also directed to methods, e.g., method of controlling and/or operating a communications system including EN devices, e.g. IoT EN devices, gateways, a network server, an O&M system node, an operator policy server, and a control server, e.g. an application server. Various embodiments are also directed to methods, e.g., method of operating a network server to select, e.g., using CWMs, a gateway to used for wireless downlink communication to an end node from among a plurality of alternative candidate gateways, said selection, based on additional information in addition to RSSI. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

Various embodiments are, implemented without the need for end user devices or GWs to include any additional functionality, e.g., hardware functionality, or capabilities beyond that normally included in standard EN devices and GWs. This is because control, e.g., intelligence used to implement the selection of the GW for downlink to a end node, is placed and implemented in the network server (NS or controller) and/or in the O&M system and/or in operator policy server, thus allowing EN devices and GWs to obtain the benefits made possible without requiring changes to EN devices or GWs.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g. a control server such as application server (AS), a network server, an O&M system node, n operator policy server, a gateway such as an IoT gateway, an End Node (EN) device such as EN IoT device, e.g. EN IoT sensor or application device, a user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a control server such as application server (AS), network server, an O&M system node, an operator policy server, gateway such as IoT gateway, End Node (EN) device such as EN IoT device, e.g. EN IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server such as application server (AS), network server, an O&M system node, an operator policy server, a gateway such as an IoT gateway, End Node (EN) device such as EN IoT device, e.g. EN IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each one or more of the steps of the various described methods performed by the device in which the processor is included. In some but not all embodiments a device, e.g., a control server such as application server (AS), a network server, an O&M node, an operator policy server, a gateway such as IoT gateway, End Node (EN) device such as EN IoT device, e.g. EN IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as control server such as an application server (AS), a network server, an O&M node, an operator policy server, a gateway such as IoT gateway, End Node (EP) device such as EN IoT device, e.g. EN IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
operating a network server to receive a policy provisioning message including policy information which can overrule selection of a gateway based on Received Signal Strength Indicator (RSSI) information, said policy information including at least one of the following: i) a list of applications which are allowed to use particular gateways; ii) a list of end node devices which are allowed to use particular gateways; iii) a list of end node devices which are not allowed to use particular gateways or iv) a list of combinations of end node devices and applications which are allowed to use particular gateways;
operating the network server to select, from a plurality of gateways, a first gateway to be used for downlink communications to a first end node, said first end node being an end node device, and wherein operating the network server to select the first gateway to be used for downlink communications to the first end node includes:
generating a composite gateway selection metric for the first end node and each individual one of the plurality of gateways based on RSSI information corresponding to the first end node and at least some policy information relevant to the first end node, said generating producing a set of gateway selection metrics; and
selecting the first gateway to be used for downlink communications to the first end node from said plurality of gateways based on the generated composite gateway selection metrics in said set of gateway selection metrics; and
operating the network server to send a message to the selected first gateway to be communicated to the first end node.

2. The method of claim 1, wherein an individual generated composite gateway selection metric corresponding to a gateway is based on an RSSI value corresponding to the gateway to which the generated composite gateway selection metric corresponds and on policy information applicable to the first end node or an application being used by the first end node.

3. The method of claim 2, wherein the policy information on which a generated composite gateway selection metric is based includes blacklist or whitelist information indicating whether the first end node is prevented from using a gateway or authorized to use a gateway.

4. The method of claim 1, wherein the selected first gateway is different from a gateway which would be selected solely based on RSSI values, policy information used in generating composite gateway selection metrics for different gateways being determinative of which gateway is selected.

5. The method of claim 1, wherein the policy information used in generating composite gateway selection metrics controls which gateway is selected when different gateways have the same or similar RSSI values.

6. The method of claim 4, wherein said policy provisioning message includes blacklist information indicating applications and/or end node devices which are not to use particular gateways.

7. The method of claim 4, wherein said policy provisioning message includes blacklist information indicating locations from which end node devices are to be blocked from using particular gateways.

8. The method of claim 5, wherein said policy provisioning message includes white list information indicating applications and/or end node devices which are allowed to use particular gateways.

9. The method of claim 5, wherein said policy provisioning message includes white list information indicating locations from which end node devices are allowed to use particular gateways.

10. The method of claim 1, wherein said policy provisioning message includes red list information indicating applications and/or end node devices which are to use particular gateways under certain specified sets of conditions.

11. A communications system, comprising:
a network server including:
a first processor configured to:
control the network server to receive a policy provisioning message including policy information which can overrule selection of a gateway based on Received Signal Strength Indicator (RSSI) information, said policy information including at least one of the following: i) a list of applications which are allowed to use particular gateways; ii) a list of end node devices which are allowed to use particular gateways; iii) a list of end node devices which are not allowed to use particular gateways or iv) a list of combinations of end node devices and applications which are allowed to use particular gateways;
select, from a plurality of gateways, a first gateway to be used for downlink communications to a first end node, said first end node being an end node device, and wherein selecting the first gateway to be used for downlink communications to the first end node includes:
generating a composite gateway selection metric for the first end node and each individual one of the plurality of gateways based on RSSI information corresponding to the first end node and at least some policy information relevant to the first end node, said generating producing a set of gateway selection metrics; and
selecting the first gateway to be used for downlink communications to the first end node from said plurality of gateways based on the generated composite gateway selection metrics in said set of gateway selection metrics; and
control the network server to send a message to the selected first gateway to be communicated to the first end node.

12. The communications system of claim 11, wherein an individual generated composite gateway selection metric corresponding to a gateway is based on an RSSI value corresponding to the gateway to which the generated composite gateway selection metric corresponds and on policy information applicable to the first end node or an application being used by the first end node.

13. The communications system of claim 11, wherein the selected first gateway is different from a gateway which would be selected solely based on RSSI values when said at least one other weighted information value is the determining factor between a selection between different ones of said plurality of gateways.

14. The communications system of claim 11, further comprising:
a management node including a second processor, wherein said second processor is configured to:

operate the management node to receive gateway loading information from the network server; and operate the management node to send a management node provisioning information message to the network server with at least some information values used to select said first gateway along with one or more weighting factors to be used in generating said composite gateway selection metric.

15. The communications system of claim 14, further comprising a policy server including a third processor, and wherein said third processor is configured to:

operate the policy server to send said policy provisioning message to the network server providing gateway selection policy information to the network server, prior to the network server selecting the first gateway to be used for downlink communications to the first end node.

16. The communications system of claim 15, wherein said policy provisioning message includes blacklist information indicating applications and/or end node devices which are not to use particular gateways.

17. The communications system of claim 15, wherein said policy provisioning message includes blacklist information indicating locations from which end node devices are to be blocked from using particular gateways.

18. A non-transitory computer readable medium including computer executable instructions which when executed by a processor of a network server cause the network server to perform the steps of:

operating the network server to receive a policy provisioning message including policy information which can overrule selection of a gateway based on RSSI information, said policy information including at least one of the following: i) a list of applications which are allowed to use particular gateways; ii) a list of end node devices which are allowed to use particular gateways; iii) a list of end node devices which are not allowed to use particular gateways or iv) a list of combinations of end node devices and applications which are allowed to use particular gateways;

operating the network server to select, from a plurality of gateways, a first gateway to be used for downlink communications to a first end node, said first end node being an end node device, and wherein operating the network server to select the first gateway to be used for downlink communications to the first end node includes:

operating the network server to generate a composite gateway selection metric for the first end node and each individual one of the plurality of gateways based on Received Signal Strength Indicator (RSSI) information corresponding to the first end node and at least some policy information relevant to the first end node, said generating producing a set of gateway selection metrics; and operating the network server to select the first gateway to be used for downlink communications to the first end node from said plurality of gateways based on the generated composite gateway selection metrics in said set of gateway selection metrics; and operating the network server to send a message to the selected first gateway to be communicated to the first end node.

* * * * *